(12) United States Patent
Iino

(10) Patent No.: US 6,350,195 B1
(45) Date of Patent: Feb. 26, 2002

(54) SIDE VISOR WITH VENTILATION FUNCTION FOR CAR

(76) Inventor: Koji Iino, 1-380, Takahama-cho, Omiya-shi, Saitama (JP)

( * ) Notice: Subject to any disclaimer, the term of this patent is extended or adjusted under 35 U.S.C. 154(b) by 0 days.

(21) Appl. No.: 09/694,469

(22) Filed: Oct. 23, 2000

(30) Foreign Application Priority Data

Oct. 28, 1999 (JP) ............................................. 11-307601

(51) Int. Cl.⁷ .................................................. B60J 1/20
(52) U.S. Cl. ........................ 454/131; 454/133; 296/152
(58) Field of Search ................................ 454/130, 131, 454/132, 133; 55/385.3; 296/152, 154

(56) References Cited

U.S. PATENT DOCUMENTS

| | | | | |
|---|---|---|---|---|
| 2,127,971 A | * | 8/1938 | Graebner | 454/131 |
| 3,059,562 A | * | 10/1962 | Sturtevant et al. | 296/132 |
| 4,685,718 A | * | 8/1987 | Steenblik et al. | 296/154 |
| 5,251,953 A | * | 10/1993 | Willey | 296/152 |
| 5,683,293 A | * | 11/1997 | Mohammed | 454/132 |

* cited by examiner

Primary Examiner—Pamela Wilson
Assistant Examiner—Derek S. Boles
(74) Attorney, Agent, or Firm—Pitney, Hardin, Kipp & Szuch LLP

(57) ABSTRACT

A side visor with a ventilation function for a car, comprising: a side visor body (10) having an upper portion attached to a car body (1) and having a lower portion incurved toward a window glass (6) and provided with an airflow hole (12), when the side visor body (10) is seen in cross-sectional view; a filter casing (15) including a filter (21) and having airflow holes (15a, 15b), the filter casing (15) being attached to the lower portion and moored to the side visor body (10) through a strap (16); and a rubber packing (22) extending on a side of the filter casing (15) facing the window glass (6) so that the rubber packing (22) abuts against the window glass (6); whereby when the window glass (6) is moved down, ventilation between inside and outside of the car is ensured through the first and second airflow holes (12, 15a, 15b) and the filter (21), while dust, insects, etc. outside the car are prevented from intruding into the car.

11 Claims, 21 Drawing Sheets

FIG. 10
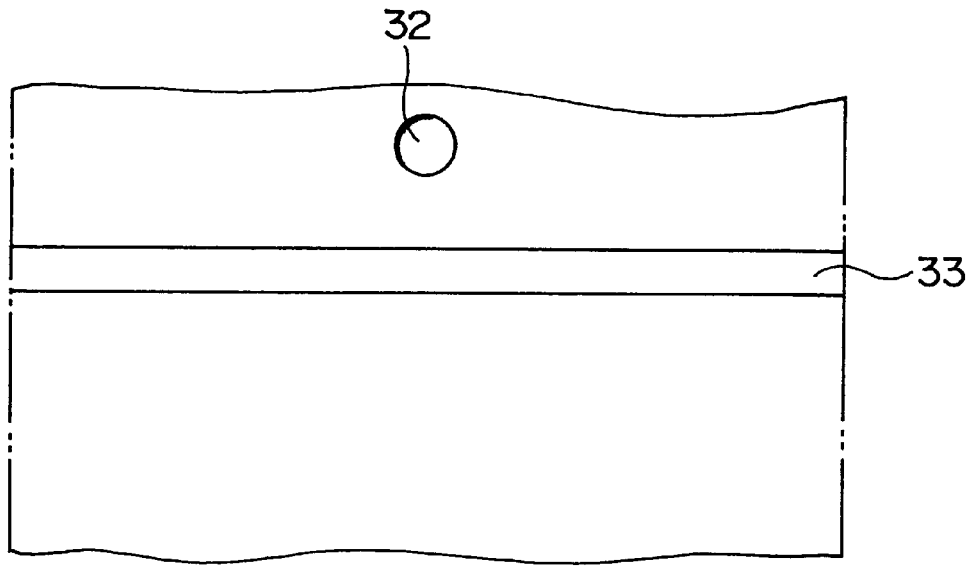
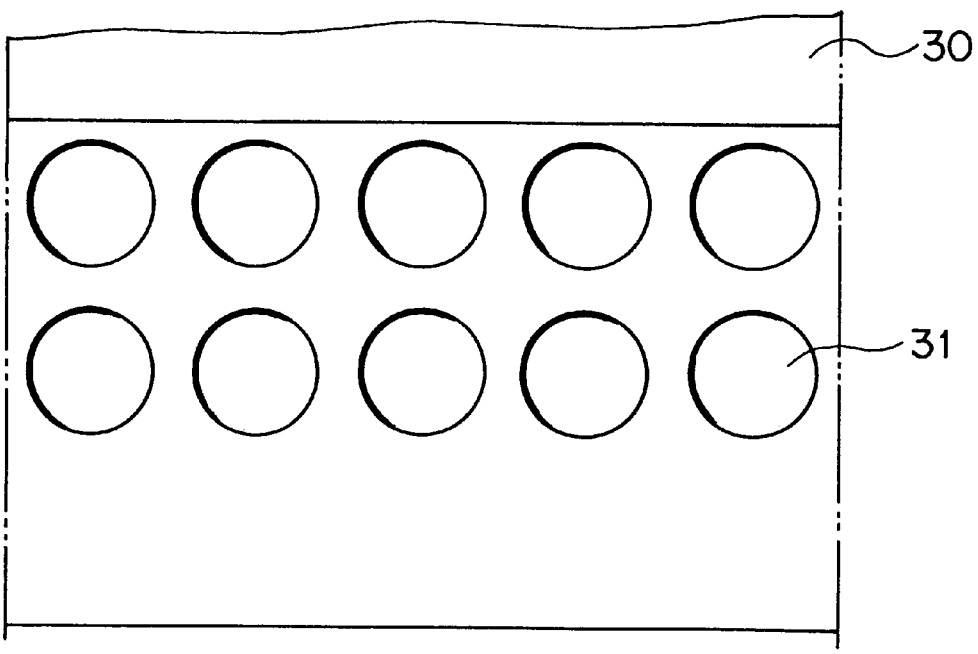

SIDE VISOR WITH VENTILATION FUNCTION FOR CAR

BACKGROUND OF THE INVENTION

1. Field of the Invention

The present invention relates to a side visor with a ventilation function for a vehicle, and particularly to a side visor with a ventilation function for a car.

2. Description of the Related Art

As a related-art side visor for a car, there is generally known a colored transparent plate-like member which functions as eaves disposed along the upper and side edges of a window glass so as to cover the window glass from its outside. Such a side visor has a form of eaves extending along a window frame particularly at the upper edge of the window glass and functions as a filter for blocking off direct sunlight into the car. However, when the window glass is moved down, a large space is left between the lower edge of the side visor and the upper edge of the window glass or between the side edge of the side visor and the side edge of the window glass. As a result, enough ventilation is indeed ensured, but there is a possibility that dust, polluted air, or objects flying in the air, such as insects or birds, intrude into the inside of the car from the outside. In such a way, comfortable driving cannot be ensured, and the safety of driving is lost so that there is a risk that an unexpected traffic accident may be brought about.

SUMMARY OF THE INVENTION

It is an object of the present invention to provide a side visor which has not only a sunshade and filter function essential to the side visor but also a function with which, when a window glass is to be moved down, the window glass can be moved down to an extent slight enough not to produce a gap in the region between the upper edge of the window glass and the lower edge of a side visor body or in the region between the side edge of the side visor and the side edge of the window glass so as to ensure ventilation in such a region while preventing dust or the like from intruding into the car.

The foregoing object is achieved by the matters of the invention defined in claims 1 to 11.

According to an aspect of the present invention, a lower portion of a side visor body used conventionally is incurved. Airflow holes are provided in this incurved lower region. A filter is provided in the lower region through a filter casing. Alternatively, a plate-like filter may be provided between the side visor body and the upper edge of a window glass, or a roll filter is provided to stretch therebetween. When the window glass has been moved down, ventilation is ensured in the region between the upper edge of the window glass and the lower edge of the side visor body or between the side edge of the window glass and the side edge of the side visor body. Thus, the inside of the car communicates with the outside while dust, polluted air, or flying objects in the air such as insects or birds, or the like, is prevented from intruding into the inside of the car through the aforementioned region.

BRIEF DESCRIPTION OF THE DRAWINGS

FIGS. 1(a) to 1(c) are partial views of a car having a side visor with a ventilation function for a car according to the present invention, in which FIG. 1(a) is a front view thereof, FIG. 1(b) is a partial detail view of a blocking plate in the lower corner of a window, and FIG. 1(c) is a cross-sectional view thereof;

FIGS. 3(a) to 3(c) are perspective views showing a main constituent portion of the side visor with a ventilation function for a car shown in FIG. 2, in which FIG. 3(a) shows a side visor body, FIG. 3(b) shows a filter, and FIG. 3(c) shows a filter casing;

FIGS. 4(a) and 4(b) shows the filter casing suspended from the side visor body, in which FIG. 4(a) is a front view thereof, and FIG. 4(b) is a detail view of a strap ring portion;

FIGS. 8(a) and 8(b) are sectional views taken on central line of a side visor with a ventilation function for a car according to a second embodiment of the present invention, in which FIG. 8(a) is a view showing a state in which the lower end of a filter is fixed to a lower portion of a side visor body, and FIG. 8(b) is a view showing a state in which the lower end of the filter is not fixed to the lower portion of the side visor body;

FIG. 10 is a view showing the inside of a side visor body of the side visor shown in FIGS. 8(a) and 8(b);

FIGS. 20(a) and 20(b) are sectional views taken on center line of the side visor with a ventilation function for a car according to an eighth embodiment of the present invention shown in FIG. 19, in which FIG. 20(a) is a partially sectional view of an engagement portion between one end of the side visor and a blocking plate, and FIG. 20(b) is a partially sectional view of an engagement portion between the other end of the side visor and another blocking plate.

DESCRIPTION OF THE PREFERRED EMBODIMENTS

A side visor with a ventilation function for a car according to the present invention will be described on the basis of embodiments thereof shown in FIGS. 1(a), 1(b), 1(c) through FIGS. 20(a), 20(b).

Figure 1A:
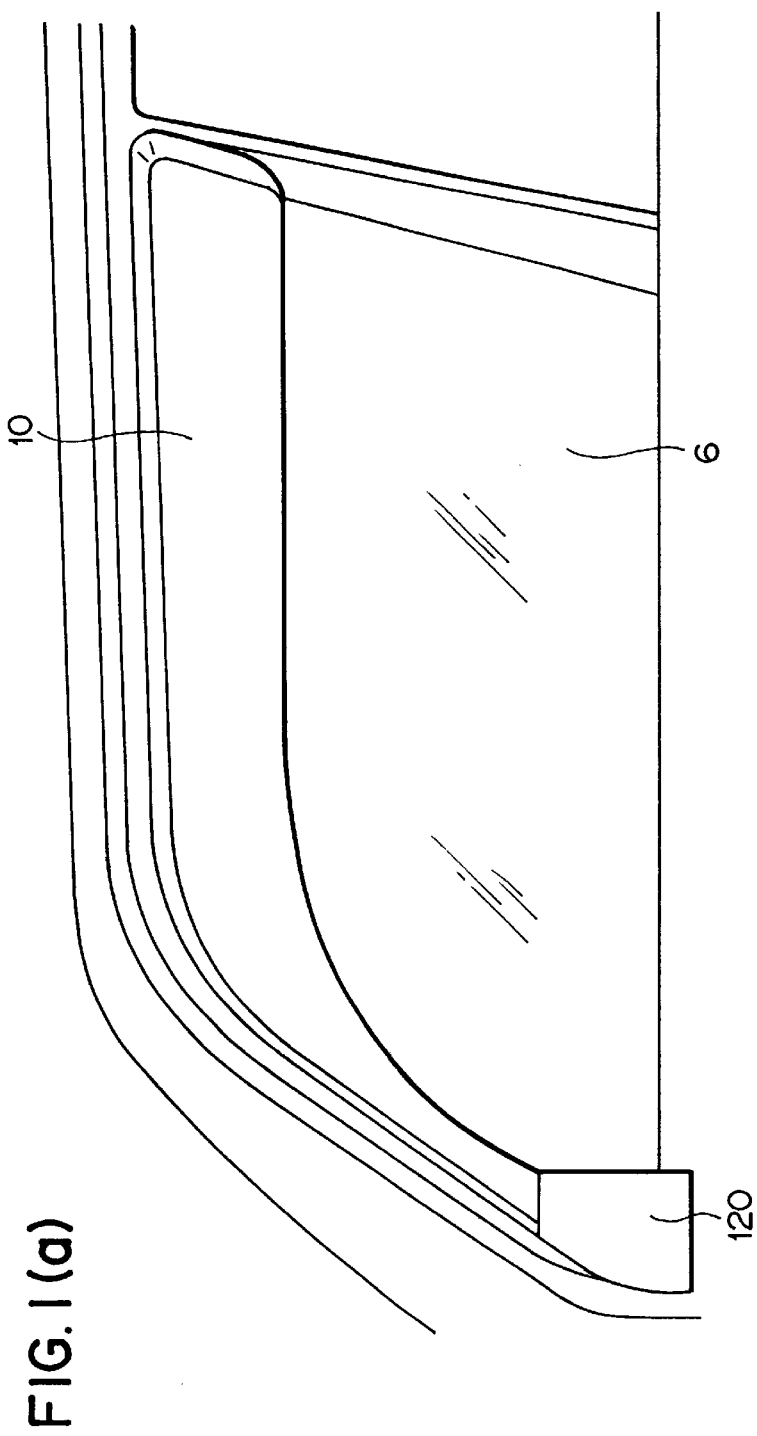
Figure 1B:
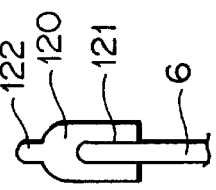
Figure 1C:
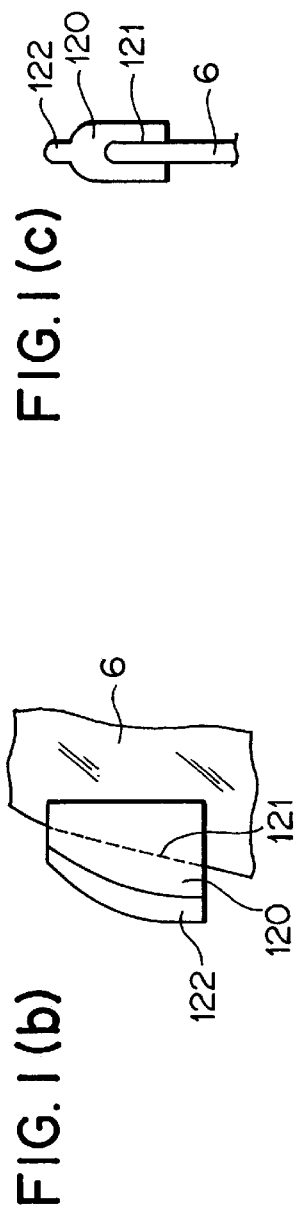
Figure 3A:
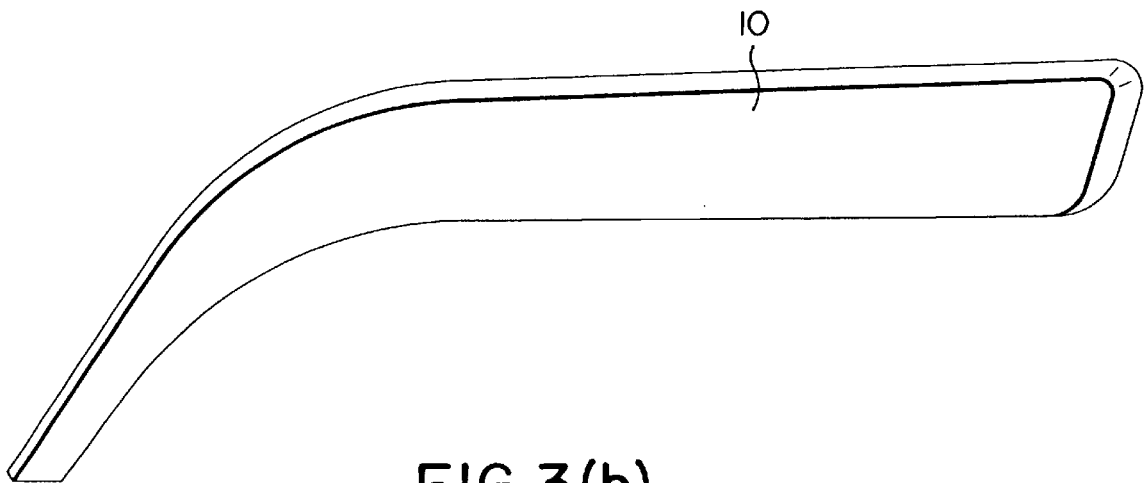
Figure 3B:
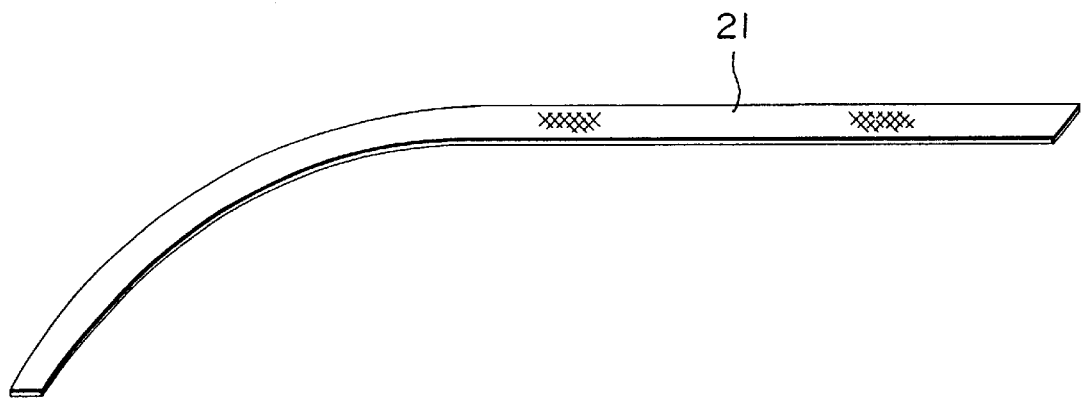
Figure 3C:
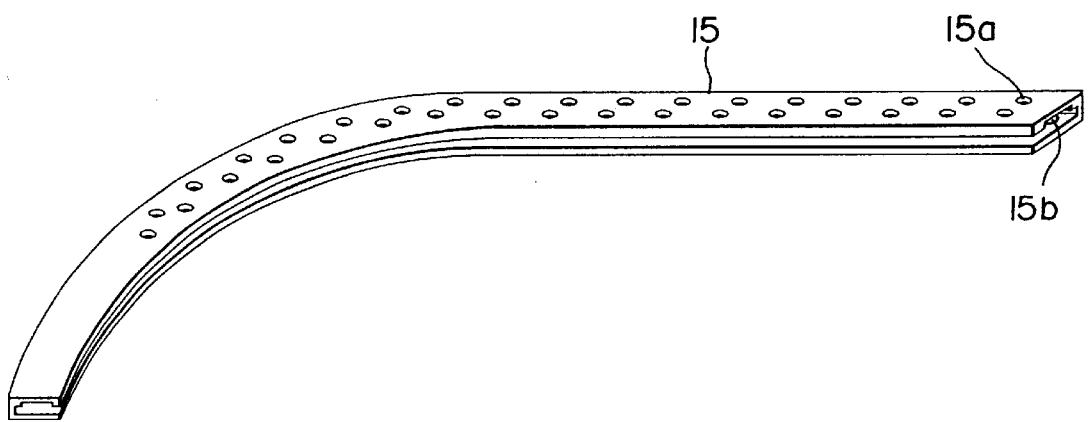
Figure 4A:
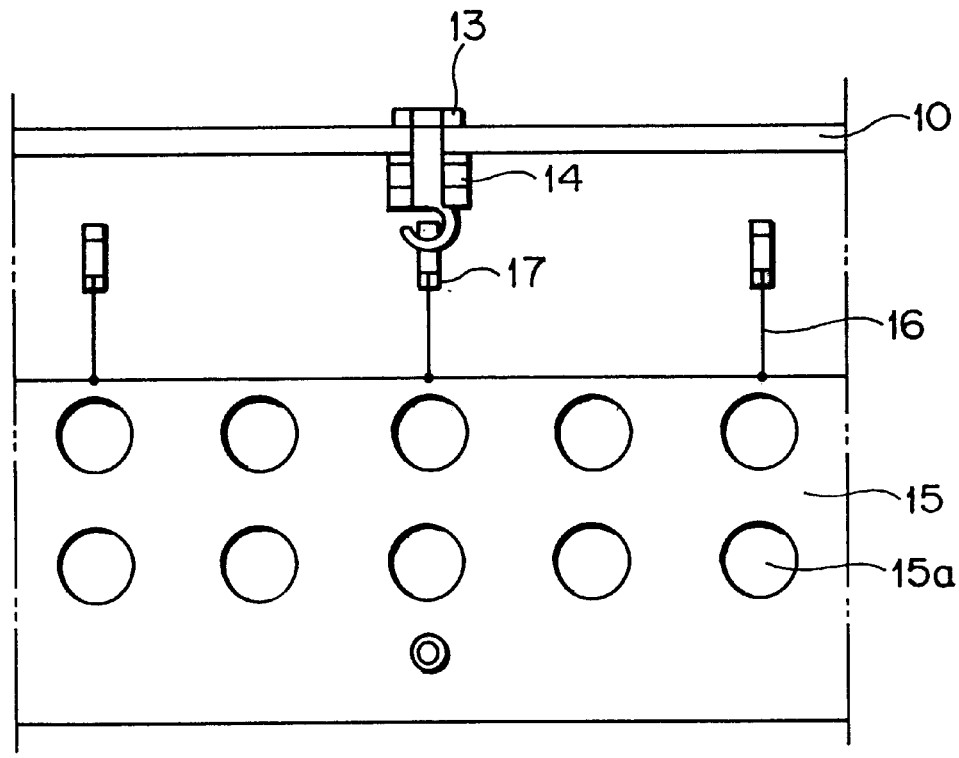
Figure 4B:
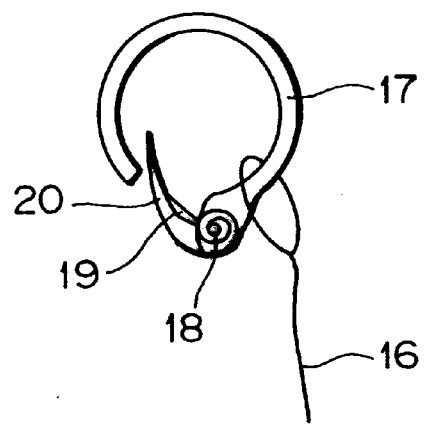
Figure 5:
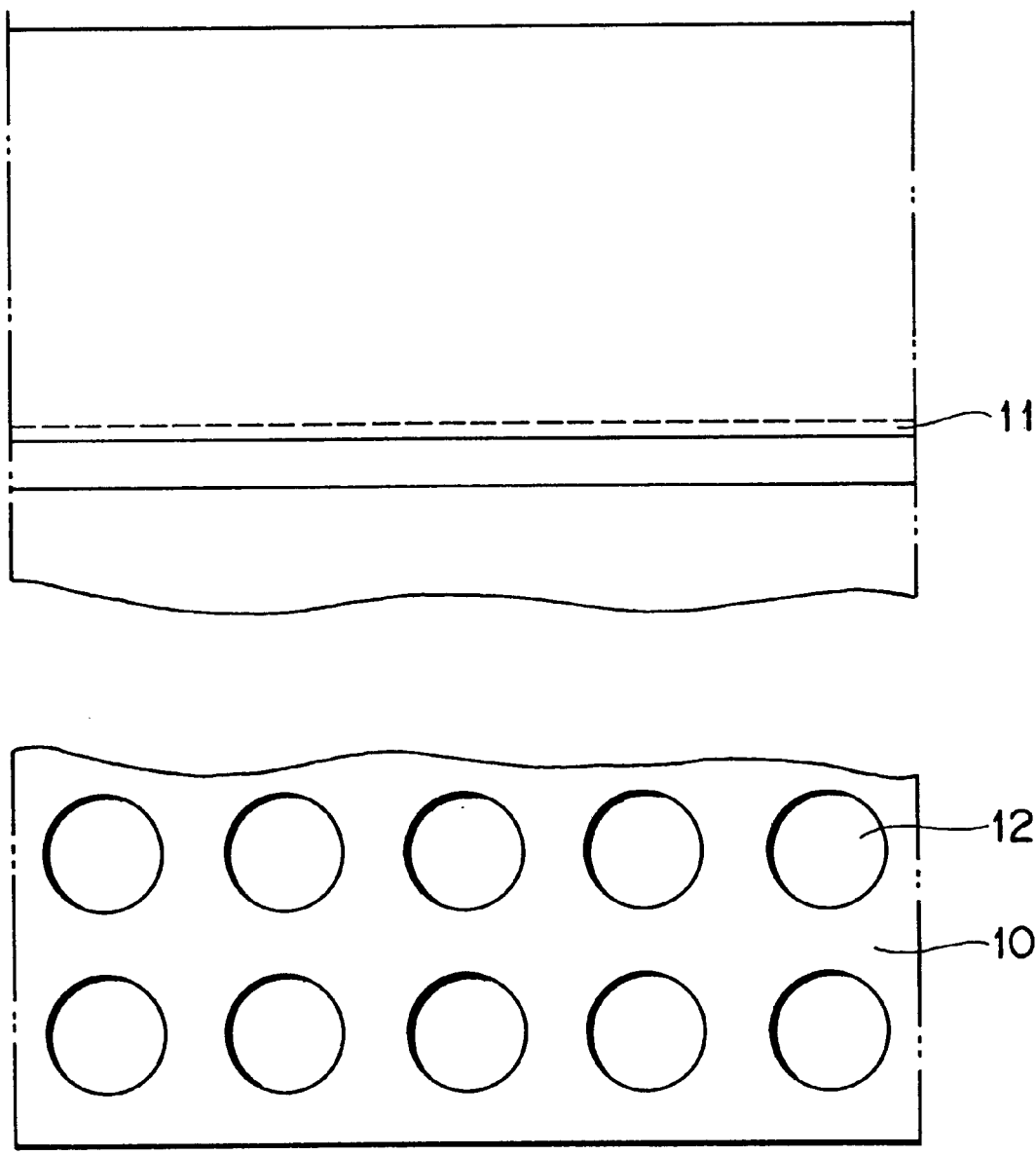
FIG. 5 is a view showing the inside of the side visor.
Figure 6:
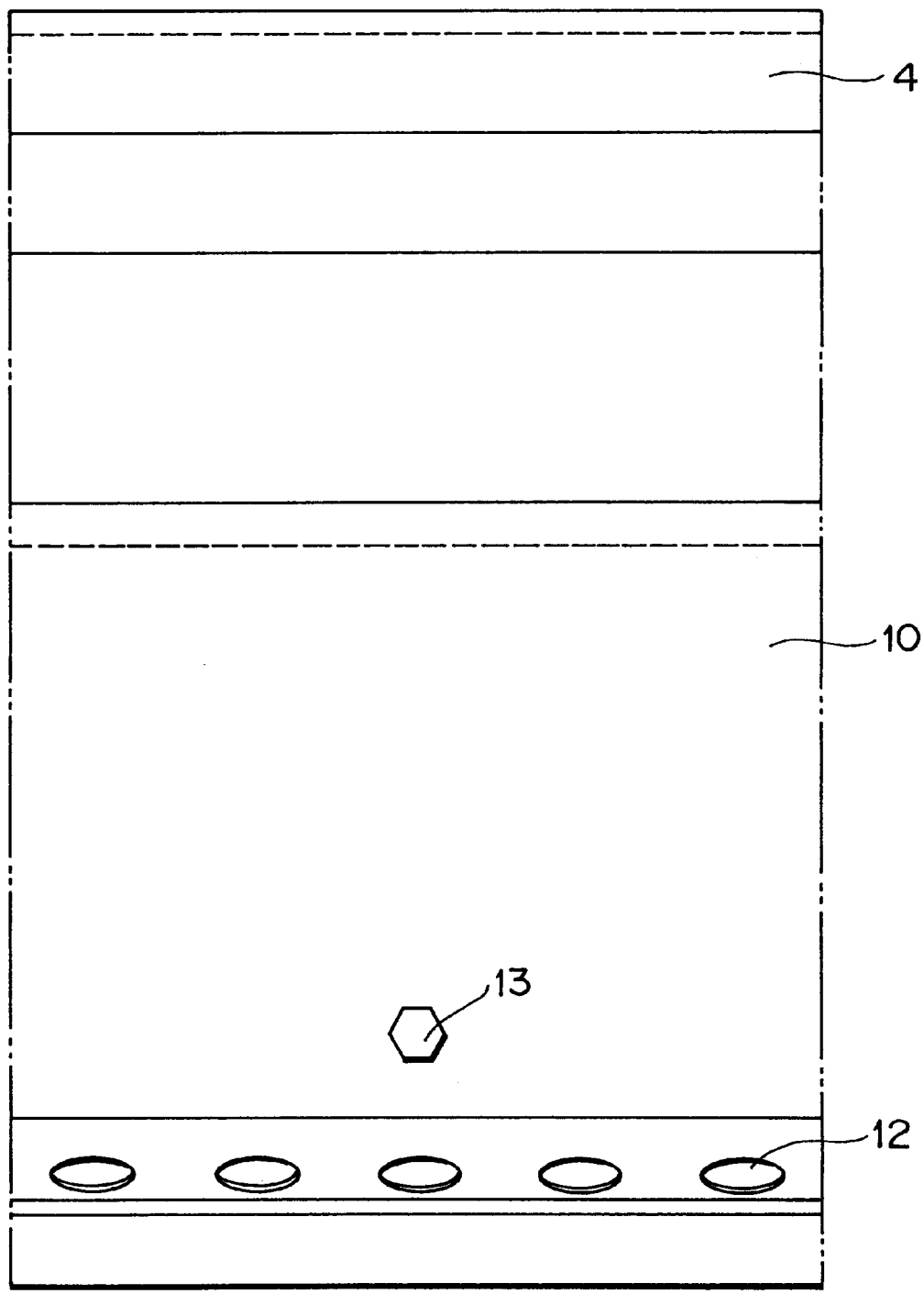
FIG. 6 is a front view of the side visor.
Figure 7:
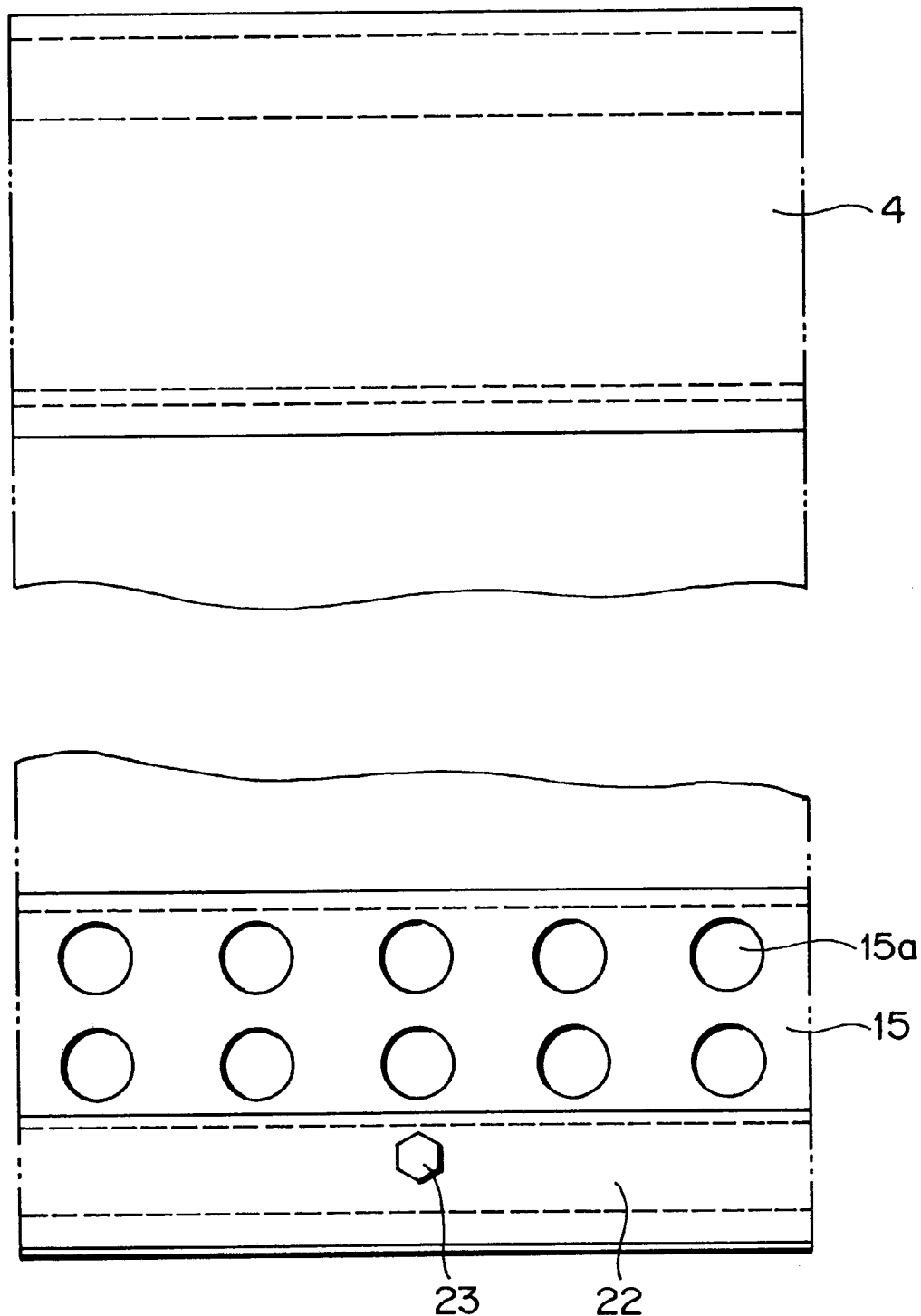
FIG. 7 is a view showing the inside of a side visor fixture and the filter casing shown in FIG. 2.
Figure 8A:
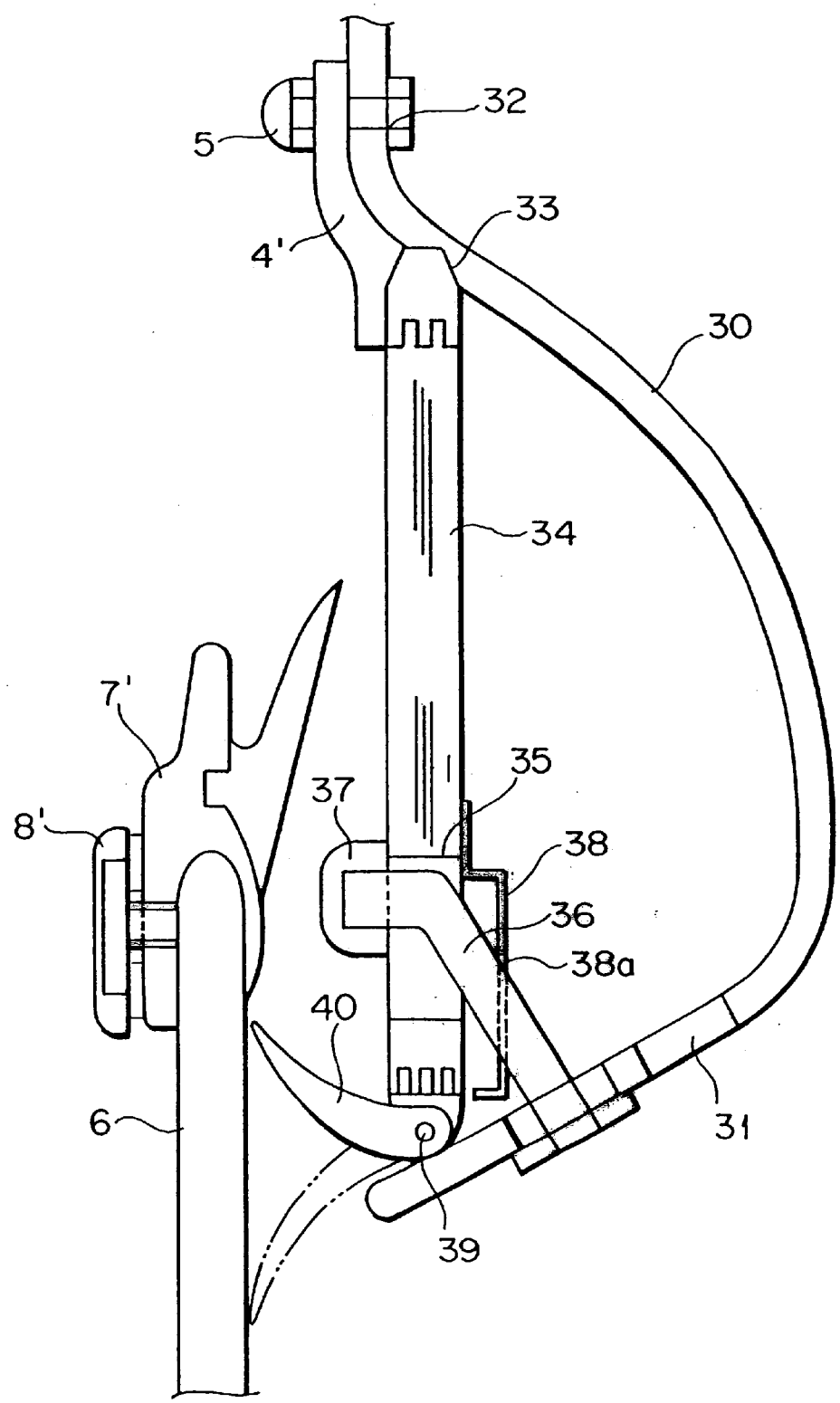
Figure 8B:
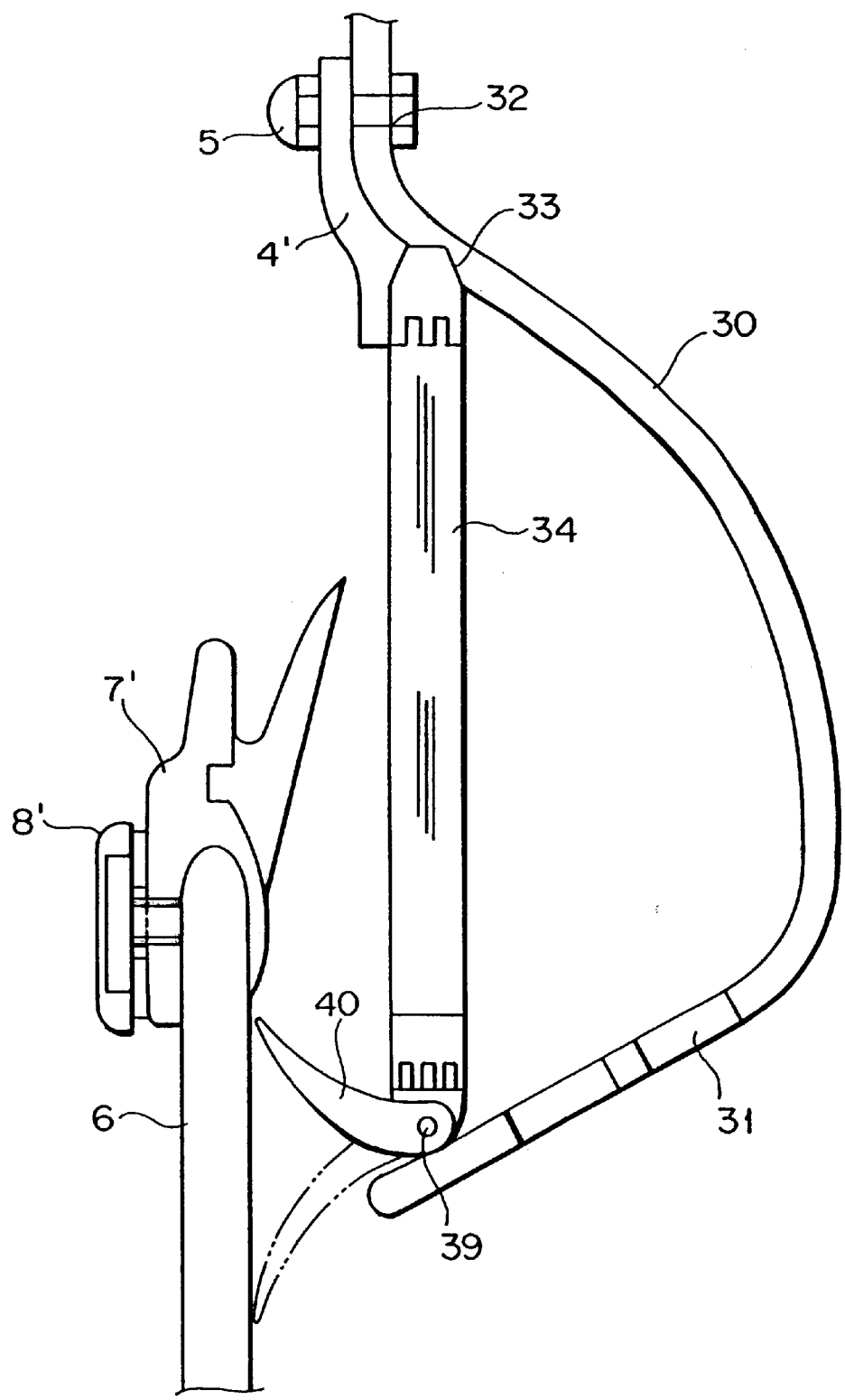
Figure 13:
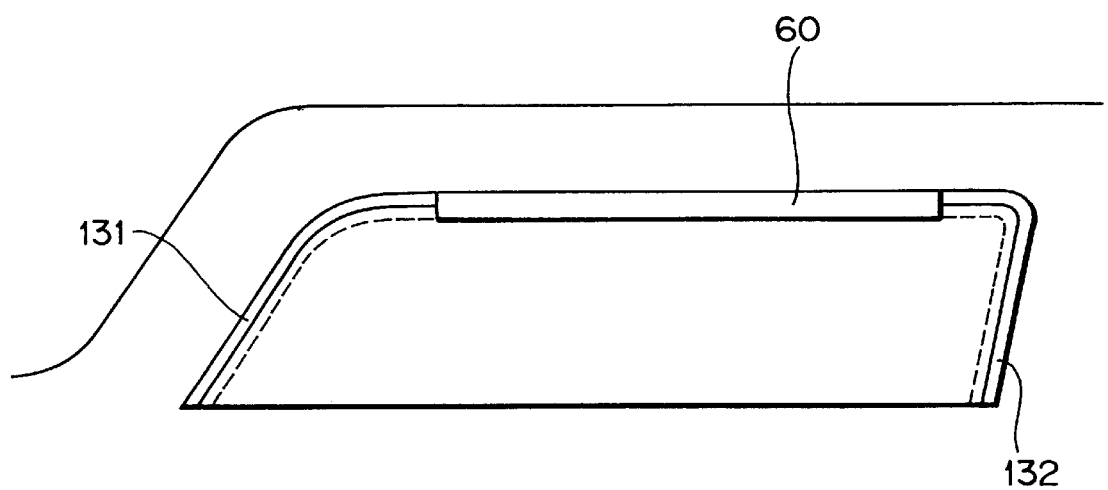
FIG. 13 is a partial view of a car having a side visor with a ventilation function for a car according to the present invention.
Figure 17:
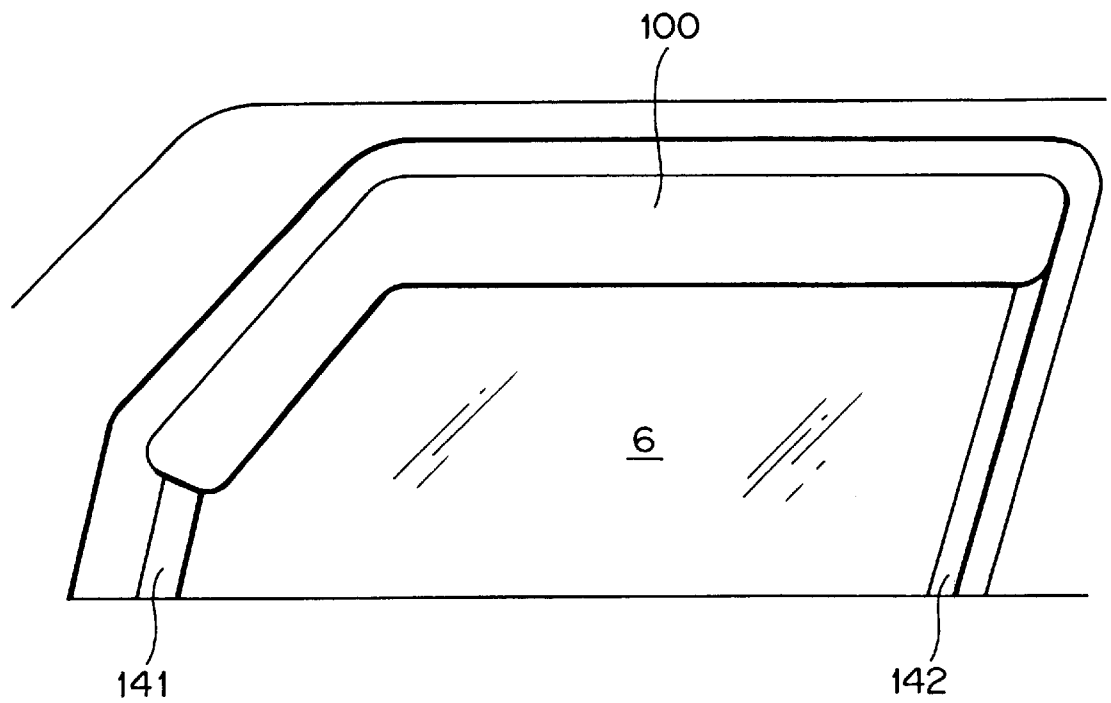
FIG. 17 is a partial view of a car having a side visor with a ventilation function for a car according the present invention.

FIGS. 1(a) to 1(c) show a side visor body 10 according to the present invention, which is provided on a window frame of a side door of a car. A blocking plate 120 is provided in a side edge region of a window glass, particularly in a lower corner portion thereof. Window glass grooves for upper and side edges of a window glass 6 are provided in a car body 1. Since the upper edge groove and the side edge groove have the same sectional shape and form a series of grooves, they will be described with the same reference numeral 2 for the sake of convenience. The blocking plate 120 is applied to first to third embodiments of a side visor with a ventilation function for a car according to the present invention. As shown in FIGS. 1(a) to 1(c), the blocking plate 120 has a window glass side edge groove 121 into which a side edge of the window glass 6 will be fitted, and a protrusion edge 122 which will be fitted into the window glass side edge groove 2 of the car body 1. The blocking plate 120 is located between one side edge of the window glass 6 and the window glass side edge groove 2 of the car body 1 so as to have a blocking function for closing an air gap between the side edge of the window glass and the window frame in a circumferential region which will be out of the side visor body 10 when the window glass is moved down. In another embodiment, the blocking plate 120 may be fixed to the lower corner portion of the window frame directly without having such a window glass side edge groove 121 into which a side edge of the window glass 6 will be fitted. In another embodiment (not-shown), such an illustrated blocking plate 120 may be omitted if the side visor body 10 can be designed to be extended and tapered down to the lower corner of the window frame of the window glass. In such a case, not to say, the side visor body is further extended in its left end region as shown in FIG. 3(a) so as to have a function as the blocking plate 120 shown in FIGS. 1(a) to 1(c). In FIG. 13 or 17, blocking plates 131 and 132 or 141 and 142 disposed at the opposite side edges of the window glass essentially have functions and shapes similar to those of the blocking plate 120 shown in FIGS. 1(a) to 1(c). However, the configuration shown in FIG. 13 or 17 is different from that in FIGS. 1(a) to 1(c) only in the point where the blocking plates 131 and 132 or 141 and 142 are disposed on the opposite side edges of the window glass. Of course, also in the configuration in FIGS. 1(a) to 1(c), blocking plates may be disposed at the opposite side edges of the window glass in accordance with necessity. In short, the blocking plates 120, 131, 132, 141 and 142 engage with the side edges of the window glass 6 and the window glass side edge grooves 2 provided in the car body, so as to have a function of blocking air gaps which may be produced therebetween when the window glass 6 is moved down. The side visor with a ventilation function for a car according to the present invention is applicable to a rear window as well as a side door window. When the side visor with a ventilation function for a car according to the present invention is applied to a rear window, only the blocking plates on the opposite sides are provided while the side visor body is eliminated because dust, insects, etc. rarely intrude into the running car from its rear portion. For a front glass window at a driver's seat, it is necessary to apply the side visor to the front glass window without hindrance to driving. If there is a fear of hindering driving, it may be used only during stopping.

Figure 2:
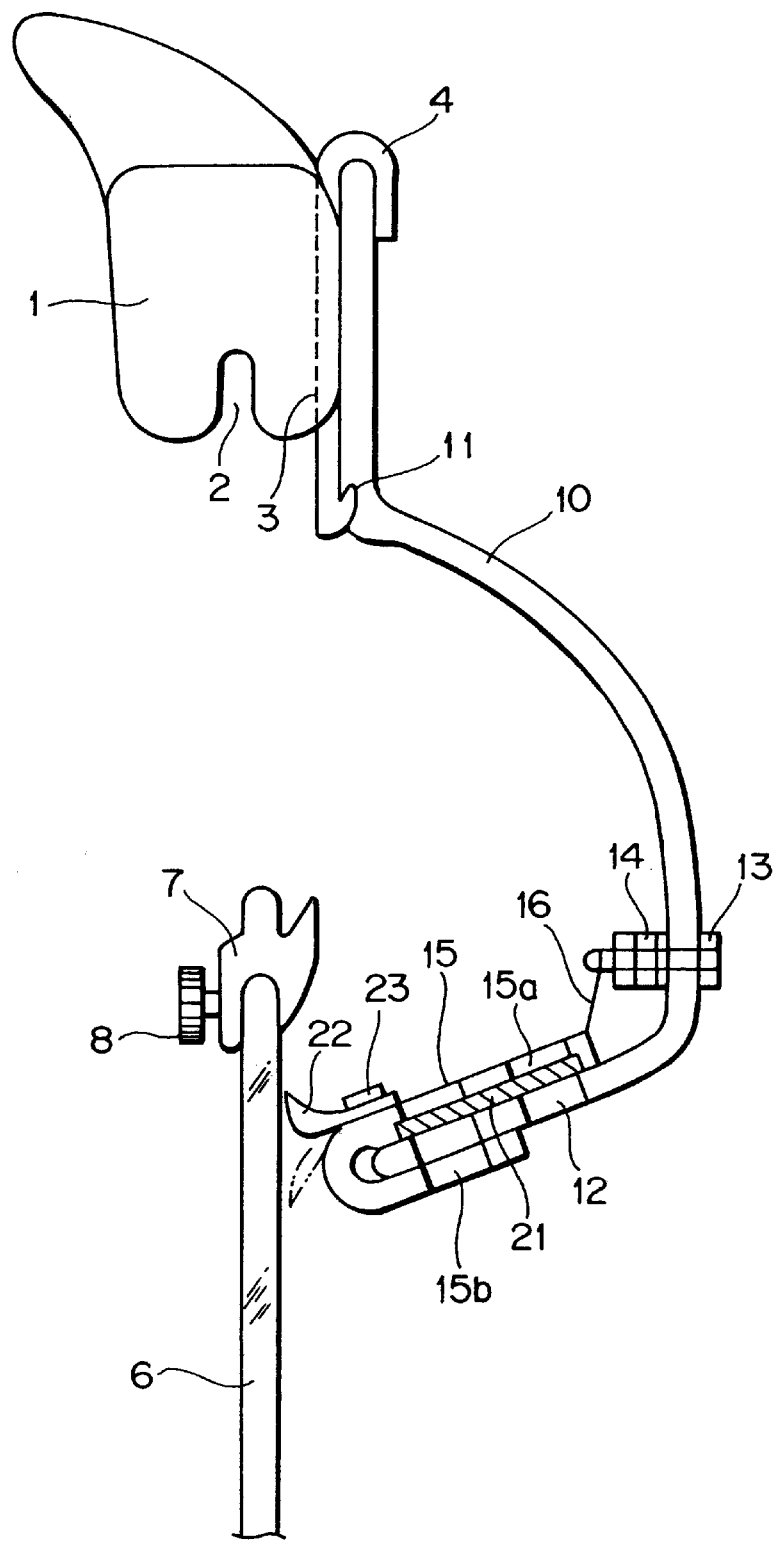
FIG. 2 is a sectional view taken on center line of the side visor with a ventilation function for a car according to a first embodiment of the present invention shown in FIG. 1(a)

FIG. 2 through FIG. 7 show a first embodiment of a side visor with a ventilation function for a car according to the present invention. In FIG. 2, a window glass upper edge groove 2 into which the upper edge of the window glass 6 will be fitted is formed in the car body 1. A protrusion edge projecting upward over the whole length of a packing 7 fixed to the upper edge of the window glass 6 by a fixing screw 8 is fitted into the window glass upper edge groove 2 when the window glass 6 is moved up. Thus, the air gap between the upper edge of the window glass 6 and the window frame is closed. A fixture seat 3 is further formed in the car body 1. A fixture 4 for locking the side visor body 10 is fixed to the fixture seat 3 by a not-shown method, for example, by screwing. The fixation of the side visor body 10 by the fixture 4 is performed by the engagement between a protrusion provided on the fixture 4 and a lock notch 11 formed in the side visor body 10. A lower portion of the side visor body 10 hanging down vertically and somewhat bent is further incurved toward the window glass 6, and the incurved lower portion is provided with a plurality of airflow holes 12. A filter casing 15 including a filter 21 is fitted to the lower portion of the side visor body 10. Each of the plurality of airflow holes 12 in the lower portion of the side visor body 10 may be shaped into a desirable shape such as a star-shape, a rectangular shape, a triangular shape, a slit, a long hole, or the like, as well as a circular shape. The airflow holes in the lower portion of the side visor body 10 are shaped likewise also in other embodiments which will be described later. The filter 21 may be made of paper, cloth, net, metal mesh, air-permeable plastic material, or the like. The filter casing 15 may be made of plastic, rubber, an aluminum alloy, a magnesium alloy, or the like. The filter casing 15 has a U-shape and includes a plurality of airflow holes 15a and 15b in its upper and lower foot portions (FIG. 3(c)). A rubber packing 22 for sealing a gap between the window glass 6 and the side visor body 10 extends on the side of the filter casing 15 facing the window glass 6 until it reaches the window glass 6. The packing 22 is fixed to the filter casing 15 by a fixing screw 23. The abutment mechanism between the rubber packing 22 and the window glass prevents rainwater, insects, sand, dust, etc. from intruding into the casing through a communication channel between the lower portion of the side visor body 10 and the upper edge of the window glass 6. In addition, in order to prevent the filter casing 15 from sliding out of the lower portion of the side visor body 10, one end of a strap 16 is fixed to one end of the filter casing 15 while a strap ring 17 is attached to the other end of the strap 16. The strap ring 17 is engaged with a hook of a hanger bolt 13 fixed to the side visor body 10 through a nut 14, so that the filter casing 15 can be moored at the side visor body 10. The strap ring 17 has a lock claw 20 which is pivotally supported, through a helical spring 19, on a hinge pin 18 fixed to one opened end of the strap ring 17, so as to close the other opened end of the strap ring 17 [FIGS. 4(a) and 4(b)]. The side visor body 10, the filter 21 and the filter casing 15 are shown in FIGS. 3(a), 3(b) and 3(c) respectively. Although the whole shape of the rubber packing 22 is not shown, not to say, the rubber packing 22 has length corresponding to the whole width of the window glass 6 and has length corresponding to the length of the lower edge of the side visor body 10 shown in FIG. 3(a).

Figure 9:
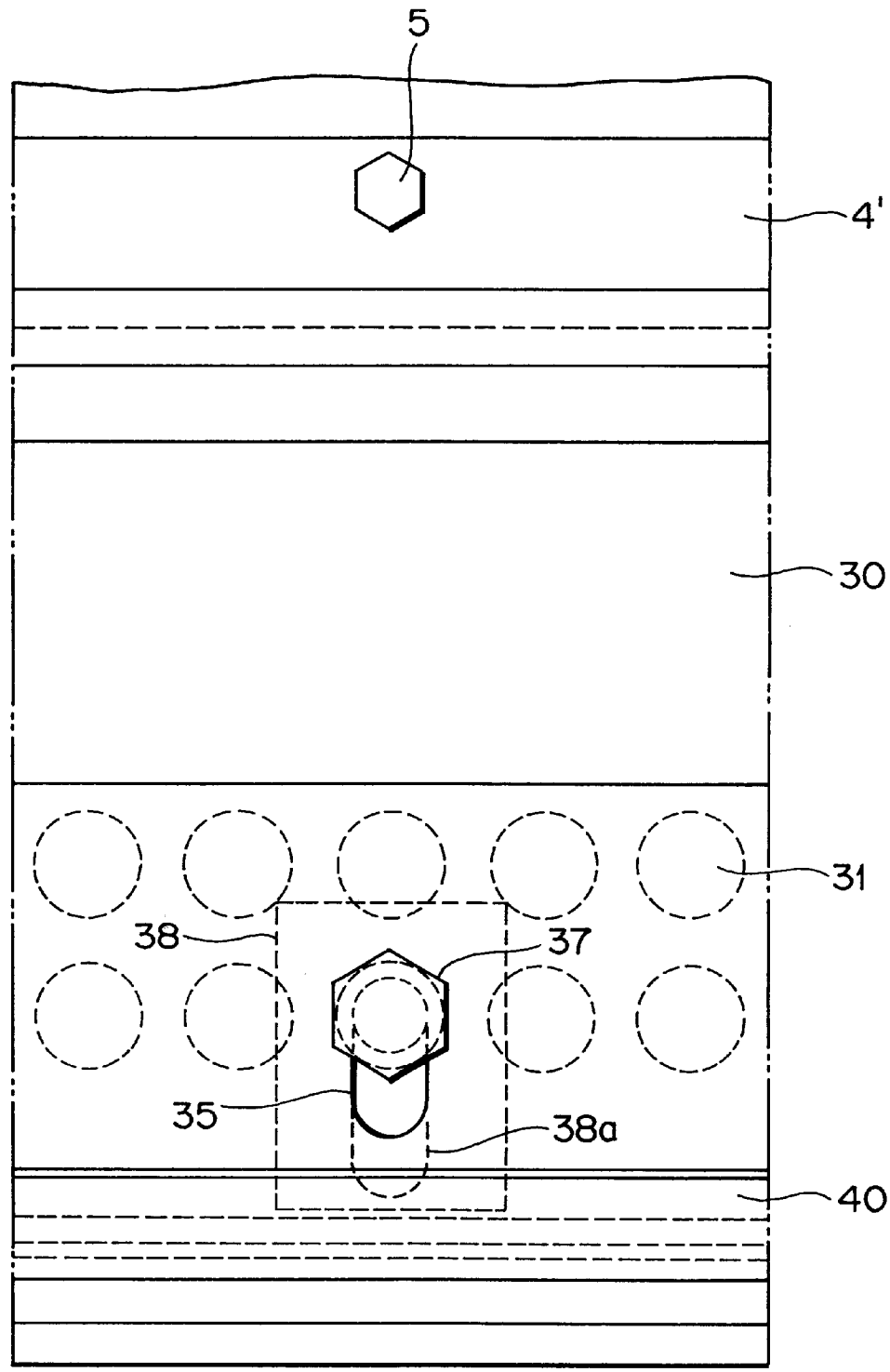
FIG. 9 is a view showing the inside of the side visor shown in FIGS. 8(a)

FIGS. 8(a), 8(b), 9 and 10 show a second embodiment of a side visor with a ventilation function for a car according to the present invention. A packing 7', which is attached to the upper edge of the window glass 6 and which may be made of aluminum or plastic, has a function similar to that in the first embodiment shown in FIG. 2, but is different in shape from the first embodiment. That is, a pressing packing made of rubber for assisting closing is further provided adjacently to a protrusion edge which is fitted into the window glass upper edge groove 2. The packing 7' is fixed to the window glass 6 by a fixing screw 8'. The fixing screw 8' is similar to the fixing screw 8 shown in the first embodiment, but the screw head portion of the fixing screwing 8' is made large and flattened so that it can be gripped by hand easily. A side visor body 30 is incurved at its lower portion toward the window glass 6 substantially in the same manner as that in the first embodiment, and the side visor body is provided at its lower portion with a plurality of airflow holes 31 (FIGS. 8(*a*), 8(*b*), 9 and 10). The side visor body 30 is fixed at its upper portion to a filter attachment plate 4'. The filter attachment plate 4' is fixed to the car body 1 by a fixing screw 5 passing through a bolt hole 32. The upper end of a filter 34 is held between the filter attachment plate 4' and a filter lock groove 33 of the side visor body 30 while the lower end of the filter 34 abuts against the lower portion of the side visor body 30. A bent bolt 36 passes through one of the lower airflow holes 31 of the side visor body 30 and a long hole 35 of the filter 34. The bent bolt 36 is fastened by a nut 37 so as to fixedly press the filter 34 onto the lower portion of the side visor body 30 (FIG. 8(*a*)). The reference numeral 38 represents a blocking plate for the long hole 35 of the filter 34. The reference numeral 38*a* represents a long hole for preventing interference with the bent bolt 36 (FIG. 9). A rubber packing 40 is fixed to the lower end of the filter 34 by a fixing screw 39. The rubber packing 40 extends toward the window glass 6 until the claw-like forward end of the rubber packing 40 abuts against the window glass 6. Thus, when the window glass is moved up or down, the rubber packing 40 is bent upward or downward as illustrated, so as to achieve sealing between the window glass 6 and the lower portion of the side visor body 30. Incidentally, the lower end of the filter 34 may be frictionally engaged with the lower portion of the side visor body 30 without using the bent bolt 36 (FIG. 8(*b*)) In this case, the long hole 35 of the filter 34 as well as the bent bolt 36, the nut 37, the long hole blocking plate 38, and so on, are made unnecessary so that the configuration becomes simple. The filter 34 maybe made of wire mesh, synthetic resin, paper, or a perforated metal plate, and may be constituted by a single layer or multiple layers, for example, from a first layer to a seventh layer. Although the whole shapes of the side visor 30, the filter 34, and the rubber packings 40 and 7' shown in FIGS. 8(*a*) and 8(*b*) are not illustrated, they have length corresponding to the side visor body 10 and the filter 21 shown in FIGS. 3(*a*) and 3(*b*).

Figure 11:
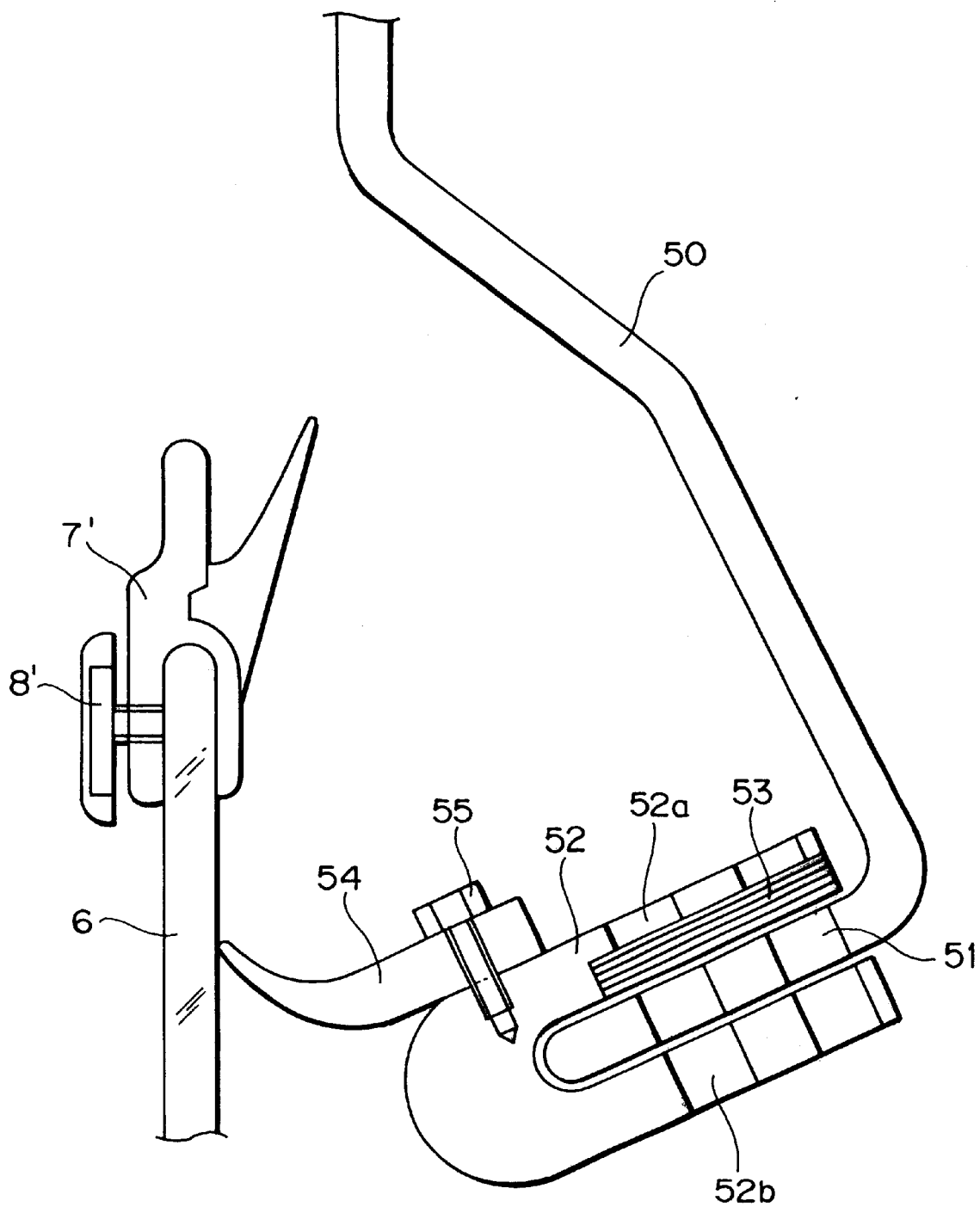
FIG. 11 is a sectional view taken on central line of a side visor with a ventilation function for a car according to a third embodiment of the present invention.
Figure 12:
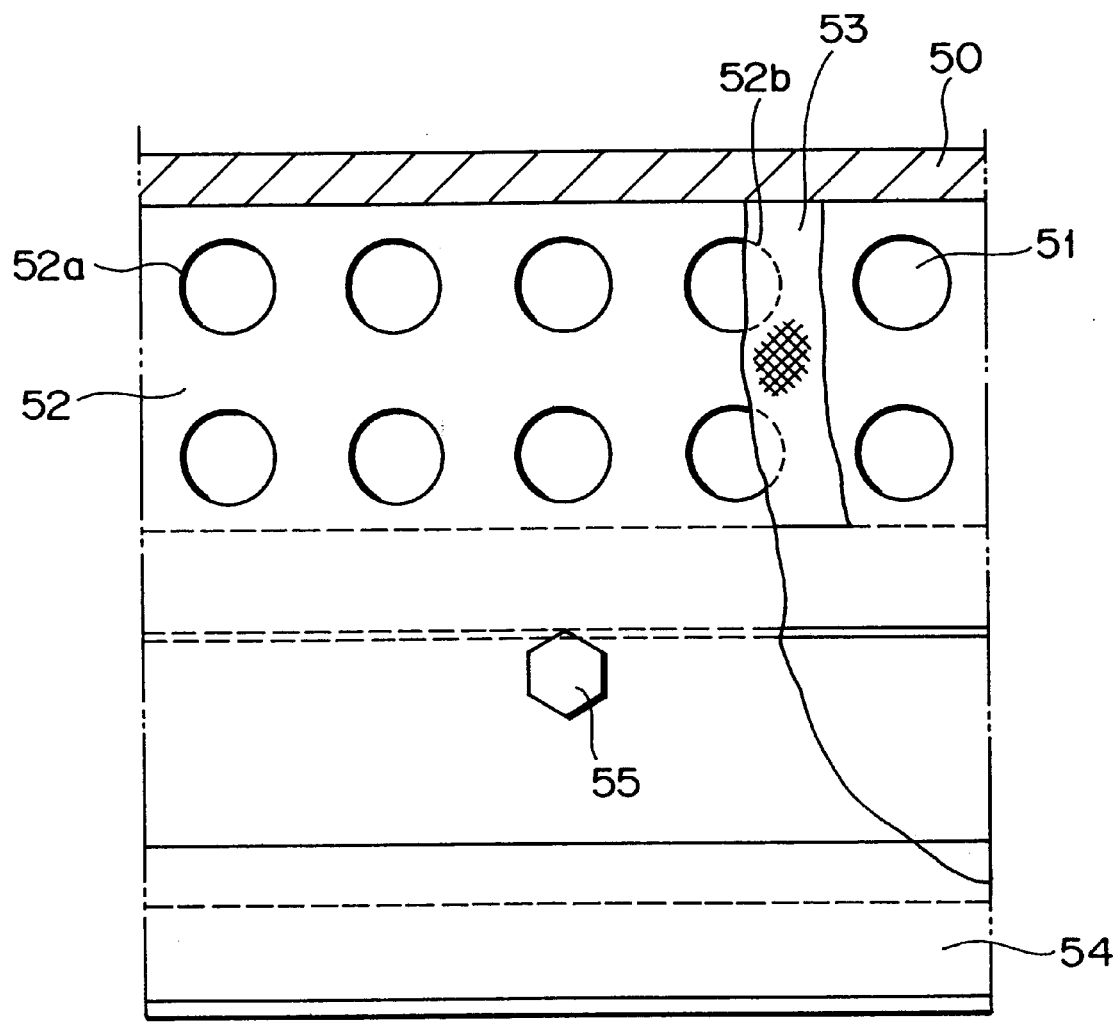
FIG. 12 is a cutaway view of the side visor with a ventilation function for a car shown in FIG. 11, which is viewed from the inside thereof.

FIGS. 11 and 12 show a third embodiment of a side visor with a ventilation function for a car according to the present invention. A packing 7', which is attached to the upper edge of the window glass 6, is similar in function and shape to the second embodiment shown in FIGS. 8(*a*) and 8(*b*). The packing 7' is fixed to the window glass 6 by a fixing screw 8'. A side visor body 50 is incurved at its lower portion toward the window glass 6 substantially in the same manner as that in the second embodiment, and provided with a plurality of airflow holes 51 (FIG. 11). The side visor body 50 is fixed at its upper portion to the car body 1. A filter casing 52 including a filter 53 is fitted to the lower portion of the side visor body 50. The filter casing 52 has a plurality of airflow holes 52*a* and 52*b* at its upper and lower foot portions. A rubber packing 54 extends on the side of the filter casing 52 facing the window glass 6, so as to abut against the window glass 6. The rubber packing 54 is fixed to the filter casing 52 by a fixing screw 55. The filter may be made of wire mesh, synthetic resin, fibers, or a perforated plate, or the like.

FIG. 13 is a diagram similar to FIG. 1(*a*), showing a side visor body 60 according to the present invention provided on a window of a side door of a car. Blocking plates 131 and 132 are disposed along the opposite side edges of the lower portion of the window glass. The blocking plates 131 and 132 have window glass side edge grooves into which the side edges of the window glass 6 are fitted and protrusion edges to which the window glass side edge grooves 2 are fitted substantially in the same manner as shown in FIGS. 1(*b*) and 1(*c*). The blocking plates 131 and 132 are located between the side edges of the window glass 6 and the window glass side edge grooves 2 respectively, so as to have a blocking function of closing air gaps between the side edges of the window glass 6 and the window frame when the window glass 6 is moved down.

Figure 14:
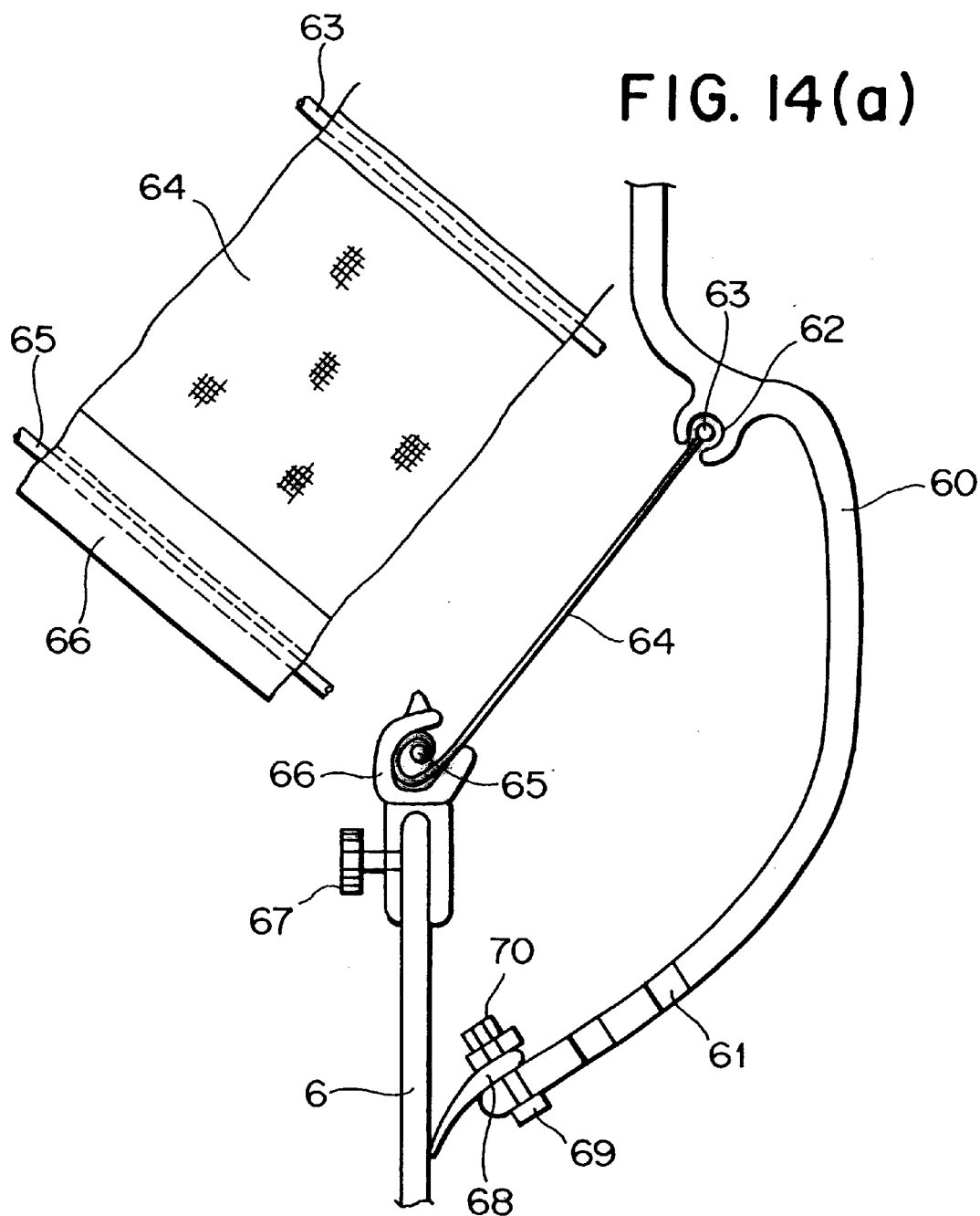
FIG. 14(a) is a sectional view taken on center line of the side visor with a ventilation function for a car according to a fourth embodiment of the present invention shown in FIG. 13.
FIG. 14(b) is a partially plan view showing a state in which a roll filter is supported.

FIGS. 14(*a*) and 14(*b*) show a fourth embodiment of a side visor with a ventilation function for a car according to the present invention. A side visor body 60 is fixed at its upper portion to the car body 1 by a not-shown method. The lower portion of the side visor body 60 is incurved toward the window glass 6, and the incurved lower portion is provided with a plurality of airflow holes 61. The airflow holes 61 may be formed as elliptic holes, slit holes, or the like. A rubber packing 68 is fixed to an end of the lower portion of the side visor body 60 through a fixing screw 69 and a nut 70. A free end of the rubber packing 68 extends to abut against the window glass 6. A roll filter casing 66 is fixed to the upper edge of the window glass 6 by a fixing screw 67. A roller 65 is disposed in the roll filter casing 66. The roller 65 to which one end of a roll filter 64 is fixed is supported by a not-shown helical spring so as to be always urged to rotate in a fixed direction. The roll filter 64 is made of metal mesh, fabric, or the like. The region where a filter lock member 63 is fixed to the other end of the roll filter 64 is made of material different from that of any other region of the roll filter 64, for example, of hair-like blocking material though the difference is not illustrated in the drawings. For example, the region may be made of sheet-like material consisting of synthetic resin, plant twigs or stalks, fabric, or the like. The roll filter 64 is pulled out against the force of the not-shown helical spring, and the filter lock member 63 fixedly attached to the other end of the roll filter 64 is locked in a filter lock hole 62 which is formed in the upper portion of the side visor body 60 integrally with the side visor body 60. Thus, the roll filter 64 can be stretched inside the side visor body 60. When the filter lock member 63 is released from engagement with the filter lock hole 62, the roll filter 64 will be rolled up in the roll filter casing 66 by the force of the helical spring. The roll filter 64 may be made of metal mesh, synthetic resin, fibers, a perforated plate, or the like. Although the whole shapes of the side visor body 60, the roll filter 64, and the rubber packing 68 shown in FIGS. 14(*a*) and 14(*b*) are not illustrated, they have, not to say, width substantially corresponding to the substantially whole length of the side visor body 60 in FIG. 13. Since the side visor body 60 is absent in regions which are out of the opposite side edges of the width of the roll filter 64 respectively, blocking plates 131 and 132 are attached over the side edges of the window glass 6 and the window glass side edge grooves of the car body 1. Each of the blocking plates 131 and 132 may have a rib at the end where it is connected to the side visor body 60, so as to block the inside space of the side visor body 60 from the outside. This rib may have a few airflow holes similarly to those in an embodiment shown in FIG. 19 and FIGS. 20(*a*) and 20(*b*), which will be described later. The blocking plates 131 and 132 are located between the side edges of the window glass 6 and the window glass side edge grooves 2 respectively, so as to have a blocking function of closing air gaps between the side edges of the window glass 6 and the window frame when the window glass 6 is moved down.

Figure 15:
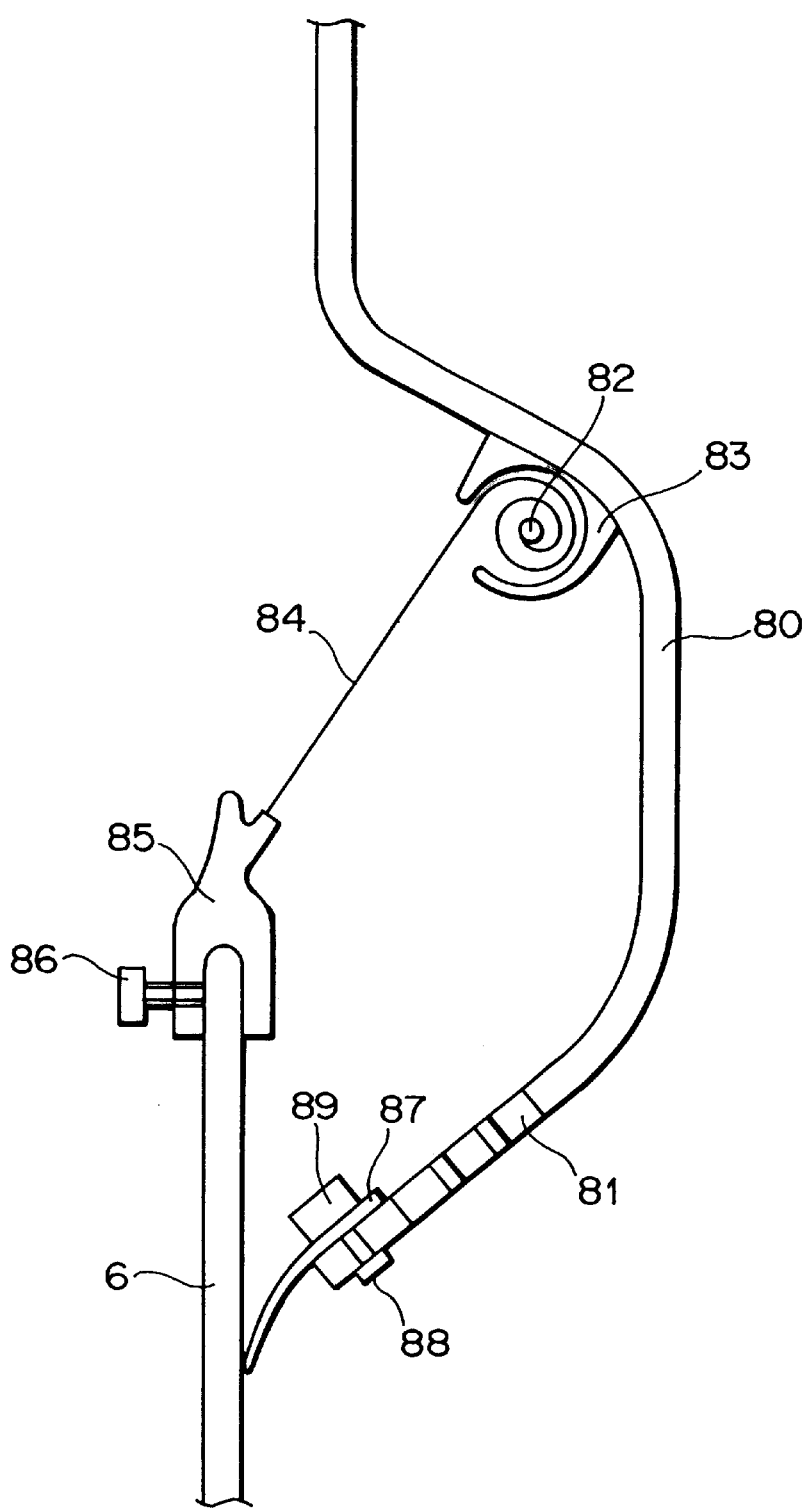
FIG. 15 is a sectional view taken on center line of a side visor with a ventilation function for a car according to a fifth embodiment of the present invention.

FIG. 15 shows a fifth embodiment of a side visor with a ventilation function for a car according to the present invention. A side visor body 80 is fixed at is upper portion to the car body 1 by a not-shown method. The lower portion of the side visor body 80 is incurved toward the window glass 6, and the incurved lower portion is provided with a plurality of airflow holes 81 formed as slit holes or round holes. A rubber packing 87 made of rubber or resin is fixed to an end of the lower portion of the side visor body 80 through a fixing screw 88 and a nut 89. A free end of the rubber packing 87 extends to abut against the window glass 6. A roll filter lock member or catcher 85 is fixed to the upper edge of the window glass 6 by a fixing screw 86. A roll filter casing 83 is fixed to the upper portion of the side visor body 80 by fixation with a bolt or bonding. A roller 82 to which one end of a roll filter 84 is fixed is supported in the roll filter casing 83 by a not-shown helical spring so as to be always urged to rotate in a fixed direction. The roll filter 84 is pulled out against the force of the not-shown helical spring, and the filter lock member 85 fixedly attached to the other end of the roll filter 84 is fixed to the upper edge of the window glass 6 by the fixing screw 86. Thus, the roll filter 84 can be stretched. The roll filter 84 may be made of metal mesh, synthetic resin, fibers, a perforated plate, or the like. Although the whole shapes of the side visor body 80, the roll filter 84, and the rubber packing 87 shown in FIG. 15 are not illustrated, they have, not to say, width corresponding to the substantially whole length of the side visor body 60 in FIG. 13. For the side visor body 60 in FIG. 13 is merely referenced as the side visor body 80 in this embodiment for the sake of convenience on description. Since the side visor body 80 is absent in regions which are out of the opposite side edges of the width of the roll filter 84 respectively, blocking plates 131 and 132 are attached over the side edges of the window glass 6 and the window glass side edge grooves 2 of the car body 1. Each of the blocking plates 131 and 132 may have a rib at the end where it is connected to the side visor body 80, so as to block the inside space of the side visor body 80 from the outside. This rib may have a few airflow holes similarly to those in the embodiment shown in FIG. 19 and FIGS. 20(a) and 20(b), which will be described later. The blocking plates 131 and 132 are located between the side edges of the window glass 6 and the window glass side edge grooves 2 respectively, so as to have a blocking function of closing air gaps between the side edges of the window glass 6 and the window frame when the window glass 6 is moved down.

Figure 16:
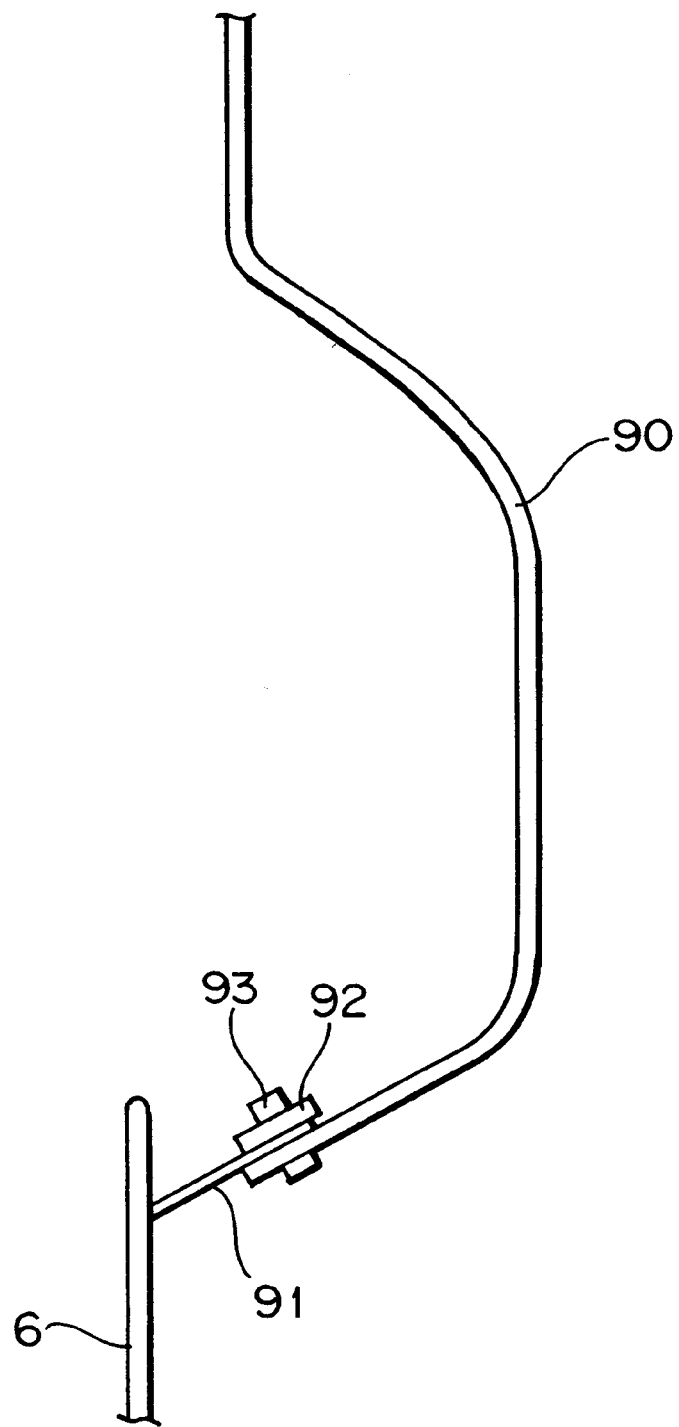
FIG. 16 is a sectional view taken on center line of a side visor with a ventilation function for a car according to a sixth embodiment of the present invention.

FIG. 16 shows a sixth embodiment of a side visor with a ventilation function for a car according to the present invention. A side visor body 90 is fixed to the car body 1 by a not-shown method. The lower portion of the side visor body 90 is incurved toward the window glass 6, and a filter 91 is fixed to an end of the bent lower portion of the side visor body 90 through a fixing screw 93 and a washer 92. Differently from the other embodiments, the lower portion of the side visor body 90 has no airflow hole. The filter 91 may be constituted by a single layer or a large number of layers of elements such as hair-like or floor-broom-like material, resin, natural fibers, or the like. Thus, the filter 91 has air permeability. Such respective elements may be tied up together by bonding, burning, or the like, so that they can be fixed to the side visor body 90 by a bolt and a nut, a rivet, a clip, or the like. Alternatively, the filter 91 may be formed integrally with the side visor body 90. The filter 91 extends to abut against the window glass 6 so as to perform sealing with the window glass 6.

FIG. 17 is a diagram similar to FIG. 1(a), showing a side visor body 100 according to the present invention provided on a window of a side door of a car. Blocking plates 141 and 142 are disposed in opposite edge regions of the window glass. The blocking plates 141 and 142 have window glass side edge grooves into which the side edges of the window glass 6 are fitted and protrusion edges to which window glass side edge grooves are fitted substantially in the same manner as shown in FIGS. 1(b) and 1(c). Each of the blocking plates 141 and 142 may have a rib at the end where it is connected to the side visor body 100, so as to block the inside space of the side visor body 100 from the outside. This rib may have a few airflow holes similarly to those in an embodiment shown in FIGS. 19, 20(a) and 20(b), which will be described later. The blocking plates 141 and 142 are located between the side edges of the window glass 6 and the window glass side edge grooves 2 respectively, so as to have a blocking function of closing air gaps between the side edges of the window glass 6 and the window frame when the window glass 6 is moved down.

Figure 18:
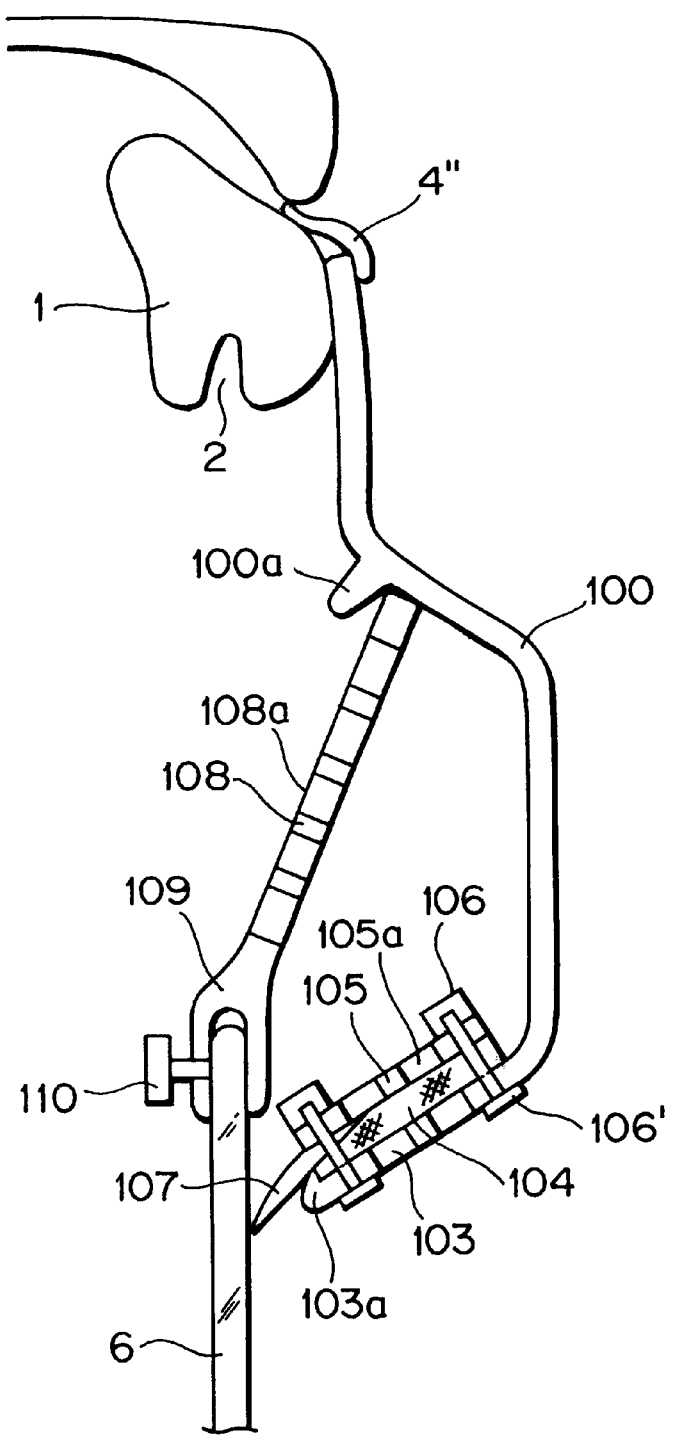
FIG. 18 is a sectional view taken on center line of the side visor with a ventilation function for a car according to a seventh embodiment of the present invention shown in FIG. 17.

FIG. 18 shows a seventh embodiment of a side visor with a ventilation function for a car according to the present invention. A side visor body 100 is fixed at its upper region to the car body 1 by a fixture 4". The lower portion of the side visor body 100 is incurved toward the window glass 6, and provided with a plurality of airflow holes 103. A filter 104 locked in a hook 103a and a filter pressing plate 105 having an airflow hole 105a are fixed to an end of the lower portion of the side visor body 100 through a fixing screw 106' and a nut 106. Further, in an one-end region of the filter 104, a rubber packing 107 is fixed to the lower portion of the side visor body 100 together with the filter 104. A free end of the rubber packing 107 extends to abut against the window glass 6. A filter lock member or catcher 109 is fixed to the upper edge of the window glass 6 through a fixing screw 110. The filter lock member or catcher 109 is coupled integrally with a filter member 108 so as to form a filter. The filter member 108 is provided with a plurality of airflow holes 108a. The other end of the filter, that is, the filter member 108, reaches a pressing rib 100a of the side visor body 100 so that the filter can be frictionally engaged between the pressing rib 100a and the upper edge of the window glass 6. Blocking plates 141 and 142 are disposed in the opposite edge regions of the window glass. Each of the blocking plates 141 and 142 may have a rib at the end where it is connected to the side visor body 100, so as to block the inside space of the side visor body 100 from the outside. This rib may have a few airflow holes similarly to those in the embodiment shown in FIGS. 19, 20(a) and 20(b), which will be described later. The blocking plates 141 and 142 are located between the side edges of the window glass 6 and the window glass side edge grooves 2 respectively, so as to have a blocking function of closing air gaps between the side edges of the window glass 6 and the window frame when the window glass 6 is moved down.

Figure 19:
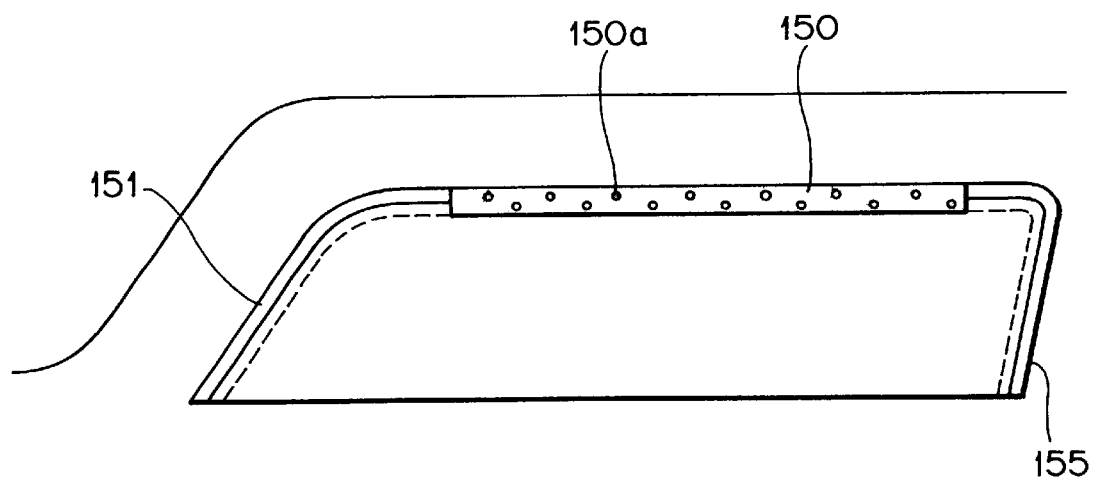
FIG. 19 is a partial view of a car having a side visor with a ventilation function for a car according to the present invention.
Figure 20A:
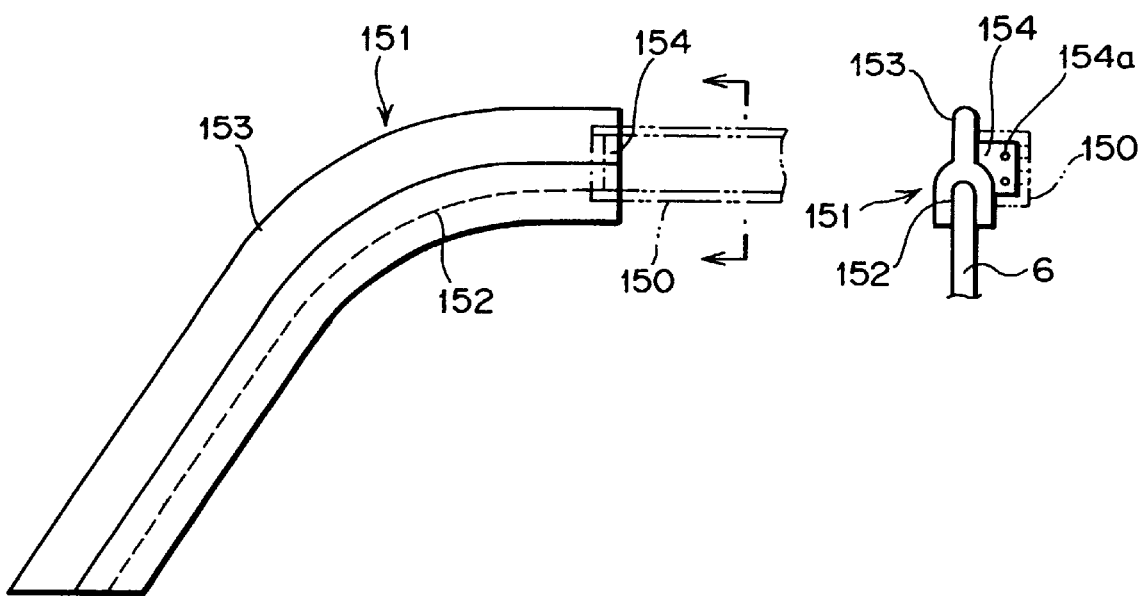
Figure 20B:
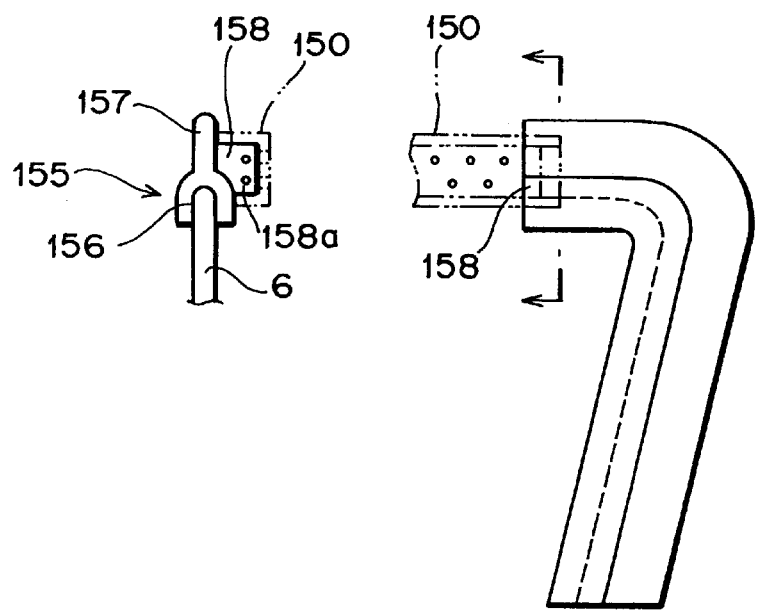

FIGS. 19, 20(a) and 20(b) show an eighth embodiment of a side visor with a ventilation function for a car according to the present invention. A side visor body 150 having a plurality of airflow holes 150a is disposed in an upper straight-line region of the window frame when the window glass 6 is moved down. At least one blocking plate 151 is disposed along one of the side edges of the window glass 6. The blocking plate 151 is engaged with one end of the side visor body 150, and seated on the side edge of the window glass 6 by a window glass side edge groove 152 in the inside of the blocking plate 151. On the other hand, on the outer side of the blocking plate 151, a protrusion edge 153 is fitted into the window glass side edge groove 2 of the car body 1. Thus, the side visor body 150 and the blocking plate 151 are fixedly positioned relatively to the window glass 6. On the other hand, at least one blocking plate 155 is disposed along the other side edge of the window glass 6. The blocking plate 155 is engaged with the other end of the side visor body 150, and seated on the side edge of the window glass 6 by a window glass side edge groove 156 in the inside of the blocking plate 155. On the other hand, on the outer side of the blocking plate 155, a protrusion edge 157 is fitted into the window glass side edge groove 2 of the car body 1. Thus, the side visor body 150 and the blocking plate 155 are fixedly positioned relatively to the window glass 6. Both blocking ribs 154 and 158 adhering closely to the inner surface of the side visor body 150 at the opposite ends of the side visor body 150 are useful in blocking between the blocking plates 151 and 155. However, since a certain measure of air permeability is required, a few airflow holes 154a and 158a are provided.

In this embodiment, a desired ventilation function can be ensured and dust, insects, or the like, from the outside, can be prevented from intruding into the inside by a simple method in which no filter is used and the side visor with a ventilation function for a car is incorporated between the window glass and the window frame in the state where the window glass has been moved down to some extent properly.

According to the present invention, a side visor is configured to have not only a sunshade/filter function essential to the side visor but also a function with which a window glass can be moved down to an extent slight enough not to produce an air gap in the region between the upper edge of the window glass and the lower edge of a side visor body or in the region between the side edge of the side visor and the side edge of the window glass so as to ensure ventilation in such a region while preventing dust or the like from intruding into the car. As a result, the outside air is introduced into the car during driving so as to attain not only natural ventilation of the car but also air-conditioning based on the natural ventilation. At the same time, because dust, objects flying in the air, such as insects, or the like, are prevented from intruding into the car. Thus, comfortable driving is guaranteed anywhere inside or outside the country even on the geographical conditions that the outside air temperature is comparatively high and in the circumferences that the air-conditioning effect is low. As a result, driving obstructions which can cause accidents are avoided.

What is claimed is:

1. A side visor with a ventilation function for a car, comprising:

a side visor body (10) having an upper portion attached to a car body (1) and having a lower portion incurved toward a window glass (6) and provided with a first airflow hole (12), when said side visor body (10) is seen in cross-sectional view;

a filter casing (15) including a filter (21) and having second airflow holes (15a, 15b), said filter casing (15) being attached to said lower portion; and a rubber packing (22) extending on a side of said filter casing (15) facing said window glass (6) so that said rubber packing (22) abuts against said window glass (6);

whereby when said window glass (6) is moved down, ventilation between inside and outside of said car is ensured through said first and second airflow holes (12, 15a, 15b) and said filter (21), while dust, insects, etc. are prevented from intruding into said car.

2. A side visor with a ventilation function for a car, comprising:

a side visor body (10) having an upper portion attached to a car body (1) and having a lower portion incurved toward a window glass (6) and provided with a first airflow hole (12), when said side visor body (10) is seen in cross-sectional view;

a filter casing (15) including a filter (21) and having second airflow holes (15a, 15b), said filter casing (15) being attached to said lower portion and moored to said side visor body (10) through a strap (16); and a rubber packing (22) extending on a side of said filter casing (15) facing said window glass (6) so that said rubber packing (22) abuts against said window glass (6);

whereby when said window glass (6) is moved down, ventilation between inside and outside of said car is ensured through said first and second airflow holes (12, 15a, 15b) and said filter (21), while dust, insects, etc. are prevented from intruding into said car.

3. A side visor with a ventilation function for a car, comprising:

a side visor body (30) having an upper portion attached to a car body (1) and having a lower portion incurved toward a window glass (6) and provided with an airflow hole (31), when said side visor body (30) is seen in cross-sectional view;

a filter (34) fitted and locked in between a filter lock groove (33) and a filter attachment plate (4') provided in said upper portion so that said filter (34) extends over said lower portion and said upper portion, said filter (34) being fixed to said lower portion by a bent bolt (36); and a rubber packing (40) fixed to said lower portion and a lower end of said filter (34) through a fixing screw (39), said rubber packing (40) extending so that said rubber packing (40) abuts against said window glass (6) of said car;

whereby when said window glass (6) is moved down, ventilation between inside and outside of said car is ensured through said airflow hole (31) and said filter (34), while dust, insects, etc. are prevented from intruding into said car.

4. A side visor with a ventilation function for a car, comprising:

a side visor body (50) having an upper portion attached to a car body (1) and having a lower portion incurved toward a window glass (6) and provided with a first airflow hole (51), when said side visor body (50) is seen in cross-sectional view;

a filter casing (52) including a filter (53) and having second airflow holes (52a, 52b), said filter casing (52) being attached to said lower portion; and a rubber packing (54) extending on a side of said filter casing (52) facing said window glass (6) so that said rubber packing (54) abuts against said window glass (6);

whereby when said window glass (6) is moved down, ventilation between inside and outside of said car is ensured through said first airflow hole (51) and said filter (53), while dust, insects, etc. are prevented from intruding into said car.

5. A side visor with a ventilation function for a car, comprising:
   a side visor body (60) having an upper portion attached to a car body (1) and having a lower portion incurved toward a window glass (6) and provided with an airflow hole (61), when said side visor body (60) is seen in cross-sectional view;
   a rubber packing (68) extending on a side of said lower portion facing said window glass (6) so that said rubber packing (68) abuts against said window glass (6);
   a roll filter casing (66) attached along an upper edge of said window glass (6); and
   a roll filter (64) having one end fixed to a roller (65) which is supported on said roll filter casing (66) so as to be urged to rotate in one direction by a helical spring, and having the other end to which a filter lock member (63) is fixed;
   whereby said filter lock member (63) is locked in a filter lock hole (62) of said side visor body (60) when said roll filter (64) is stretched against spring force of said helical spring, whereupon when said window glass (6) is moved down, ventilation between inside and outside of said car is ensured through said airflow hole (61) and said roll filter (64), while dust, insects, etc. are prevented from intruding into said car.

6. A side visor with a ventilation function for a car, comprising:
   a side visor body (80) having an upper portion attached to a car body (1) and having a lower portion incurved toward a window glass (6) and provided with an airflow hole (81), when said side visor body (80) is seen in cross-sectional view;
   a rubber packing (87) extending on a side of said lower portion facing said window glass (6) so that said rubber packing (87) abuts against said window glass (6);
   a roll filter casing (83) fixed to said upper portion of said side visor body (80); and
   a roll filter (84) having one end fixed to a roller (82) which is supported on said roll filter casing (83) so as to be urged to rotate in one direction by a helical spring, and having the other end to which a filter lock member (85) is fixed;
   whereby said filter lock member (85) is fixed to an upper edge of said window glass (6) when said roll filter (84) is stretched against spring force of said helical spring, whereupon when said window glass (6) is moved down, ventilation between inside and outside of said car is ensured through said airflow hole (81) and said roll filter (84), while dust, insects, etc. are prevented from intruding into said car.

7. A side visor with a ventilation function for a car, comprising:
   a side visor body (90) having an upper portion attached to a car body (1) when said side visor body (90) is seen in cross-sectional view; and
   a filter (91) extending on a side of a lower portion of said side visor body (90) facing a window glass (6) so that said filter (91) abuts against said window glass (6), said filter (91) being constituted by a large number of fibrous members;
   whereby when said window glass (6) is moved down, ventilation between inside and outside of said car is ensured through said filter (91), while dust, insects, etc. are prevented from intruding into said car.

8. A side visor with a ventilation function for a car, comprising:
   a side visor body (100) having an upper portion attached to a car body (1) and having a lower portion incurved toward a window glass (6) and provided with a first airflow hole (103), when said side visor body (100) is seen in cross-sectional view;
   a first filter (104) locked and fixed to a hook (103a) at an end of said lower portion;
   a filter pressing plate (105) provided with a second airflow hole (105a) and fixed to said end of said lower portion;
   a rubber packing (107) extending on a side of said lower portion facing said window glass (6) so that said rubber packing (107) abuts against said window glass (6);
   a presser rib (100a) provided on said upper portion of said side visor body (100); and
   a second filter constituted by a filter member (108) and a filter lock member (109), one end of said filter being locked on said presser rib (100a) of said side visor body (100) while the other end is locked at an upper edge of said window glass (6) through said filter lock member (109);
   whereby when said window glass (6) is moved down, ventilation between inside and outside of said car is ensured through said first and second airflow holes (103, 105a) and said first and second filters (104, 108), while dust, insects, etc. are prevented from intruding into said car.

9. A side visor with a ventilation function for a car, comprising:
   a side visor body (150) disposed in a straight-line region of an upper portion of a window frame when a window glass (6) is moved down;
   at least one first blocking plate (151) disposed along one side edge of said window glass (6) so as to be engaged with one end of said side visor body (150); and
   at least one second blocking plate (155) disposed along the other side edge of said window glass (6) so as to be engaged with the other end of said side visor body (150);
   said side visor body (150) having a plurality of airflow holes (150a);
   each of said first and second blocking plates (151; 155) integrally having a groove (152; 156) for an edge of said window glass (6), a protrusion edge (153; 157) to be fitted into a groove (2) of a car body (1) for an edge of said window glass (6), and a blocking rib (154; 158) in a connection portion with said side visor body (150);
   whereby when said window glass (6) is moved down, ventilation between inside and outside of said car is ensured through said airflow hole (150a), while dust, insects, etc. are prevented from intruding into said car.

10. A side visor with a ventilation function for a car according to any one of said claims 1 to 8;
   wherein at least one blocking plate (120; 131, 132; 141; 142) is disposed between at least one of opposite side edges of said window glass (6) of said car and a window glass groove (2) of said car body (1) so as to extend along said at least one of opposite side edges.

11. A side visor with a ventilation function for a car according to any one of said claims 1 to 10;
   wherein said side visor is applied to a rear window of said car.

* * * * *